(12) United States Patent
Steeb, III et al.

(10) Patent No.: US 8,762,857 B2
(45) Date of Patent: Jun. 24, 2014

(54) PORTABLE DATAPORT DEVICE AND METHOD FOR RETRIEVING, INTER-RELATING, ANNOTATING AND MANAGING ELECTRONIC DOCUMENTS AT A POINT OF NEED

(75) Inventors: Raymond H. Steeb, III, Wexford, PA (US); Scott Presley, Pittsburgh, PA (US); David P. McHugh, Venetia, PA (US)

(73) Assignee: FASTTAC, Inc., Pittsburgh, PA (US)

( * ) Notice: Subject to any disclaimer, the term of this patent is extended or adjusted under 35 U.S.C. 154(b) by 474 days.

(21) Appl. No.: 12/661,171

(22) Filed: Mar. 11, 2010

(65) Prior Publication Data

US 2010/0241988 A1    Sep. 23, 2010

Related U.S. Application Data

(63) Continuation of application No. 11/699,885, filed on Jan. 30, 2007, now Pat. No. 7,698,647.

(60) Provisional application No. 60/763,208, filed on Jan. 30, 2006.

(51) Int. Cl.
*G06F 3/048* (2013.01)

(52) U.S. Cl.
USPC .......................................................... 715/738

(58) Field of Classification Search
CPC ............................ G06F 17/30011; G06F 3/048
USPC .......................................................... 715/738
See application file for complete search history.

(56) References Cited

U.S. PATENT DOCUMENTS

| | | | |
|---|---|---|---|
| 5,893,126 A * | 4/1999 | Drews et al. ................... | 715/203 |
| 5,983,073 A | 11/1999 | Ditzik | |
| 6,009,442 A | 12/1999 | Chen et al. | |
| 6,275,199 B1 * | 8/2001 | Aaker et al. ................... | 345/2.1 |
| 6,604,103 B1 | 8/2003 | Wolfe | |
| 6,782,387 B1 | 8/2004 | Kumashio | |
| 7,107,268 B1 * | 9/2006 | Zawadzki et al. ...................... | 1/1 |
| 7,425,944 B1 * | 9/2008 | Peterson ....................... | 345/156 |
| 8,131,736 B1 * | 3/2012 | Chang et al. ................... | 707/751 |
| 2004/0125081 A1 * | 7/2004 | Hayakawa ..................... | 345/156 |
| 2004/0139400 A1 * | 7/2004 | Allam et al. .................... | 715/526 |
| 2004/0194026 A1 * | 9/2004 | Barrus et al. ................... | 715/515 |
| 2004/0201622 A1 | 10/2004 | Rhodes et al. | |
| 2005/0050455 A1 * | 3/2005 | Yee et al. ....................... | 715/513 |
| 2005/0198354 A1 | 9/2005 | Holloway et al. | |
| 2006/0277470 A1 | 12/2006 | Schneider et al. | |

OTHER PUBLICATIONS

Autodesk Constructware, Autodesk, website, http://usa.autodesk.com, USA.

Skematek, The Construction Document Solution, https://portal.skematek.com, USA.

(Continued)

*Primary Examiner* — Omar Abdul-Ali
*Assistant Examiner* — Phuong Nguyen
(74) *Attorney, Agent, or Firm* — David G. Oberdick; Peter J. Borghetti

(57) ABSTRACT

A method and device for using a portable dataport for electronic document retrieving, annotating, inter-relating, and managing, comprising a view manager having an at least one-dimensional grid. The view manager and grid provide document inter-relation and management in a user friendly fashion. The view manager is electronically linked to an electronic document storage device to retrieve, inter-relate, annotate and manage the documents.

25 Claims, 31 Drawing Sheets

View Manager, Creating Permanent Record Annotation Layer

(56) References Cited

OTHER PUBLICATIONS

Kang, et al., Dynamic Layout Management in a Multimedia Bulletin Board, Proceedings of IEEE 2002 Symposia on Human Centric Computing Languages & Environments, pp. 51-53, NJ.

Bier, et al., A Document Corpus Browser for In-Depth Reading, Proceedings of 2004 Joint ACM/IEEE Conference on Digital Libraries, pp. 87-96, Piscataway, NJ.

Westerman, et al., Browsing a document collection represented in two- and three-dimensional virtual information space, Int. J. Human-Computer Studies 62 (2005) pp. 713-736, NY.

Other: PCT International Preliminary Report on Patentability, PCT/US2007/002649, Filed Jan. 30, 2007, Rcv'd Aug. 5, 2008.

Other: USPTO Office Action, U.S. Appl. No. 11/699,885, filed Jan. 30, 2007, Rcv'd Apr. 14, 2009.

Other: Response and Amendment to Apr. 14, 2009 Office Action, U.S. Appl. No. 11/699,885, Aug. 12, 2009.

Other: Notice of Allowability, U.S. Appl. No. 11/699,885, Rcv'd Nov. 23, 2009.

Examination Report for European Application No. 07762900.4 dated May 2, 2013.

\* cited by examiner

PORTABLE DATAPORT DEVICE AND METHOD FOR RETRIEVING, INTER-RELATING, ANNOTATING AND MANAGING ELECTRONIC DOCUMENTS AT A POINT OF NEED

CROSS REFERENCE TO RELATED APPLICATIONS

The present invention is a Continuation Application of U.S. Non-Provisional application Ser. No. 11/699,885, entitled "A PORTABLE DATAPORT DEVICE AND METHOD FOR RETRIEVING, INTER-RELATING, ANNOTATING AND MANAGING ELECTRONIC DOCUMENTS AT A POINT OF NEED" filed Jan. 30, 2007, which claims benefit of U.S. Provisional Application Ser. No. 60/763,208, entitled "METHOD FOR PROVIDING A DATAPORT TO RETRIEVE AND ANNOTATE ELECTRONIC DOCUMENTS AT A POINT OF NEED" filed on Jan. 30, 2006, all are incorporated herein by reference which is incorporated herein by reference.

FIELD OF THE INVENTION

The present invention relates generally to a portable dataport device and method for retrieving, inter-relating, annotating and managing documents at a particular location and/or at a point of need. The View Manager of the present invention uses a methodology to logically organize (using an application's or project's defined set of parameters) and link the documents of a given project into a one or multi-dimensional grid. Also, the View Manager uses a series of scrollable-image-viewers and a caching methodology to pre-load documents connected to a currently viewed document.

BACKGROUND OF THE INVENTION

There exists a need for a portable dataport and methodology for retrieving, inter-relating, annotating and managing documents at a point of need. This need has particular application in the construction industry, but also exists in the medical, information science, real estate management, design and engineering, transportation industry, plan and building operations, building management, emergency services, operations management and many other industries and/or fields where electronic documents must be retrieved, inter-related, managed, annotated and/or edited at a point of need.

In the context of the construction industry, as an example and not by limitation, the present invention addresses economic needs that arise from an extremely competitive industry that has low profit margins. The largest cost other than subcontracts, direct work material, and direct work labor is staff to manage the project and direct the field activities. This can be as much as three and a half percent of the construction costs, which includes the cost of the staff and the taxes, insurance and benefits required. Any reduction of field staff time or reduction of field staff numbers on projects, contributes directly to the bottom line profitability of the construction company. The present invention provides more efficient operations for field staff in order to solve the above-listed deficiencies in the construction field. The same efficiencies also have benefits in other industries and fields.

Information management in the construction industry, for the most part, is still in the paper, pencil and fax era. Most field superintendents currently use cumbersome documents and volumes of printed specifications to investigate conflicts, between contractors and/or subcontractors, building designs and/or engineering, and request the necessary information, in person, from team members. This non-automated process can be very costly and burdensome to a construction company.

The single largest cost to construction companies is their labor cost, whether for management personnel or field labor personnel. The largest variable in cost of an installation is the availability of information at the point of need. The present invention derives from these cost factors and needs and the associated benefits of faster response and turn-around times and reduced cost of labor on a project.

Another large cost of a construction project is the relocation of personnel from one work area to another due to the lack of necessary information being available for them. Reducing or eliminating these relocations by making the necessary information available to the user at the point of need, saves the construction company money and contributes to the company's profitability.

Likewise, cost issues in the construction industry arise from post-installation repairs that arise from the lack of time to effectively handle and coordinate all issues during the construction period, including punch list or action item list concerns. The present invention is designed to help track and coordinate these issues during installation and handle them immediately by electronically notifying the proper personnel of the deficiency in a timely, user friendly manner, during construction, not after.

A research study, conducted at Carnegie Mellon University, in 2003 indicated that the most ignored persons in the construction industry are the field staff when it comes to technological improvements to efficiency and information being made available at the point of need. Further discussions with construction industry leaders indicated that many of the mistakes that were discovered in the field installation were never corrected due to the inability to identify the issue, record it and quickly send it to the personnel that could correct it. If the issue identification, recordation and notification all were accomplished on a regular basis at a point of need, one large construction company suggested that it would save approximately $20 Million per year on return work.

During this same study, students involved in the study, interviewed several superintendents and project managers to determine the most desired software within the construction industry. The students and the present inventors concluded that the need for an invention to accomplish identification, recordation and notification at a point of need on the job site was missing from development in the information technology industry.

Currently, field issues are solved through a series of field and field office interactions (personal contact) that consume a lot of time for the field superintendents. Most contractors require their field superintendents to make two rounds through the construction site each work day. Anything that prevents this two round day from occurring, keeps the field superintendents adequately and satisfactorily performing their other assignments.

The present invention provides the field superintendent the freedom to stay in the field while still having adequate access to project documents. It allows the field superintendent to spend more time solving problems and communicating with the people that can provide solutions.

Other related systems have tried to solve some of the above-listed problems, yet they do not disclose, teach or suggest the solution provided by the present invention. For example, a system called, Autodesk Constructware, discloses generally a database management system for the construction industry which uploads, organizes and makes available to a user, various project documents, but only in an office environment through a hardwired, non-portable desktop requiring knowledge of computer file system management. This reference reduces the confusion sometimes caused by communication between the job site and the office. Further, the Autodesk Constructware system provides a web-based viewer for document sharing and viewing. Similar to Autodesk Constructware, Skematek also provides a construction document management service. The Skematek system requires users to have an in-depth knowledge of file system management. Skematek's service eliminates the need for a user to compile, copy and distribute copies of construction documents and further electronically archives the documents in a logical fashion. This system also discloses the ability to link documents, such as owner's manuals and warranty documentation, with construction drawings. However, neither of these two systems provide the benefits and/or advantages disclosed within the present invention, including, in particular, the View Manager's capabilities, user-friendliness, quick navigation between project documents and portability.

Another related reference, U.S. Publication number 2005/0198354 A1, to Holloway, Jr., teaches a job site communication system and computer program used for remotely communicating documents between a job site and a remote server or to persons outside of the job site. This system comprises a hand held computer device, which allows the user to view and, to some extent, make very limited annotations on the documents and CAD drawings, which the user can then transmit off-site. The transmission process in this Patent Publication requires almost expert knowledge of computers, including electronic transmission, emailing and attachments, whereas the present invention's View Manager and field communication tool is very user friendly and requires only novice computer knowledge. The system disclosed in this Patent Publication also provides the user with the ability to communicate with off-site personnel, as needed. However, this system does not disclose a View Manager and other related features of the present invention, which allow a user to easily navigate between inter-related documents and/or layers on a particular document.

Further, Patent Publication, US 2004/0201622 A1, to Rhodes et al., teaches a document distribution system which provides free form routing of documents through a system. The flexibility of this routing is provided by facilities which allow recipients, as well as the originating user, to modify the document routing through the system. Recipients also have some limited ability to annotate the documents. Again, in this reference, the user friendly View Manager, communication tools and related features of the present invention are not disclosed, taught or suggested.

SUMMARY OF THE INVENTION

It is a general object of this invention to provide a portable dataport and method for retrieving, inter-relating, annotating and managing documents at a particular location and/or at a point of need. More specifically, using what is described further below as a View Manager, it is an object of the present invention to provide, at a particular site, in a field of use, the mobility of documents that have been, (i) electronically coded with document data in an at least a one-dimensional grid system, (ii) inter-related and (iii) linked to shorten the time required to access the documents. A related object of the present invention is to provide an interconnection between project documents and the ability to place the related documents into a queue, in a manner that permits associated documents to be retrieved within a short time period using portable dataport technology or the like. Yet another object of the present invention is to permit the user to keep notes and reminders (i.e. Snapshots, Bookmarks, Permanent Record. Annotation Layers or the like) electronically attached, either permanently or non-permanently, to a specific document, whereby these notes and reminders can record information which may be accessed at some future point in time.

The View Manager of the present invention uses software to logically organize (using an application's or project's defined set of parameters) and link the documents of a given project into a one- or multi-dimensional grid. This View Manager uses a series of scrollable-image-viewers and a caching methodology to pre-load documents, into the dataport's viewer, connected to the currently viewed documents. In a preferred embodiment, the View Manager uses a document Bean that contains meta-data about a particular document and a path to that document's particular image file. In addition to the meta-data, references may also be made to one or more Snapshots, Bookmarks, Permanent Record Annotation Layers or the like. A preferred embodiment of the present invention uses a Java programming language, but the invention is not limited to use of Java. Any other programming language that has the ability to create background threads, or the like, to load connected documents or document layers that run without the knowledge of the user can be used and are within the scope of the present invention.

In operation, the View Manager allows a user to easily navigate between connected, inter-related and/or linked documents, or the like. Preferably, the View Manager is also responsible for four or more distinct tasks, namely, project loading, loading a document not already cached, loading a document that has been cached and zooming the currently displayed document. However, the zooming feature can be eliminated and the View Manager will still function properly and be within the scope of the present invention.

It is a further object of the present invention to provide a field or project site communication tool and method, associated with the portable dataport of the present invention that permits the user to communicate, track and exchange documents and other information, with other interested parties or intended recipients, electronically or by similar means. It is important to note that the user of the present invention is not required to have a working knowledge of computers, electronic transmission, email, field requests for information and/or email attachments to use the present invention because of its user friendly nature.

As a result of the field communication tool, the present invention provides further improved communication results that are twofold: 1) improved communication of project or case issues, including, for example, job site deficiency notifications, to interested and/or responsible parties, and 2) quick/complete communication of field requests for information from the document authors, designers or other individuals in a particular industry or field.

Of particular application to the construction industry (and by analogy to other applicable industries or fields of use), the present invention has a further object of changing the methodologies currently employed by field or job site personnel to solve conflicts and miscommunications at construction job sites and/or project sites and thereby streamline the field investigation and initial communication with other related parties to the project. More specifically, the present invention: (1) improves the identification, recordation and notification of field or other issues and the timing of a response by other personnel; (2) replaces the "pencil and paper" methodologies currently employed in the construction or other industries, to a digitized system for quick submission and proper record keeping at a job site and/or project site; (3) permits field staff to quickly access all construction or other documents at the point of need; (4) allows the user or field superintendent to easily navigate from one type of document, for a particular field, industry or trade to another at the same portion or stage of the project or to move to an adjacent stage of the project in any of the specialized trades, fields or other areas associated with the construction or other industries; (5) allows field staff to solve issues quickly without having to return to a field office trailer or carry bulky paper documentation with them; and, (6) allows a user to capture the documents reviewed and apply notes, reminders, changes and/or comments to the documents and then request information from other members of the job site team via the field communication tool. As a result, the present invention reduces the need for multiple field staff personnel on smaller projects and reduces the number of field staff personnel on larger projects by up to fifty percent or more.

Specifically, what is provided in one embodiment of the present invention is a method of using a portable dataport for document retrieving, inter-relating, annotating and managing, comprising the steps of loading electronic documents onto an electronic document storage device associated with the portable dataport, and using an at least one-dimensional grid of the View Manager. The grid corresponds to related document fields for navigation to related documents. Optionally, the View Manager's grid can be a two, three or more dimensional grid. The View Manager is electronically linked to the electronic document storage device to retrieve, inter-relate, annotate and manage documents. The electronic document storage device can be integral with or external to the portable dataport.

The portable dataport is preferably a tablet personal computer, a notebook personal computer or a desktop personal computer. This portable dataport preferably retrieves documents through a design grid view or a design details table view, and further provides users with the ability to toggle back and forth from a currently viewed document to a previously viewed document.

The View Manager of the present invention, further, provides the ability to: take a Snapshot of a particular document, or portion of a document, to Bookmark a document, to create and organize a Permanent Record Annotation Layer attached to the document and to create and organize an action items list with respect to any particular document or set of documents. The Snapshot, Bookmark and Permanent Record Annotation layers are recorded and track as transparent overlays of a document, such that annotations can be made to the document. The portable dataport additionally inter-relates and electronically links the Permanent Record Annotation Layers, action item lists, Snapshots and Bookmarks, to create a field request for information. Further provided is the step of using an optional field communication tool to track and communicate these field requests for information to the intended recipients.

The portable dataport can also optionally be wirelessly synchronized with a remote, host server to provide the dataport with the ability to load real-time documents. This wireless synchronization is used to access and store up-to-date secondary project elements, such as, but not limited to, users, contacts, security access, software and developmental tools. The portable dataport also provides a photograph taking function, a voice recognition function and the ability to order materials from the field.

In another embodiment of the present invention, provided is a method of using a portable dataport for document retrieving, inter-relating, annotating and managing, comprising the steps of converting a population of documents into an electronically codeable format, coding the electronic documents with document data and related document fields. The invention further comprises the step of loading electronic documents onto an electronic document storage device associated with the portable dataport and using a View Manager, having at least a one-dimensional grid. The grid corresponds to related document fields for navigation to the related documents. The View Manager is electronically linked with the electronic document storage device to retrieve, inter-relate, annotate and manage the documents.

In yet another embodiment of the present invention, provided is a method of using a portable dataport for document retrieving, inter-relating, annotating and managing, comprising the steps of, coding electronic documents with document data and related document fields. The method further comprises the step of loading electronic documents onto an electronic document storage device associated with the portable dataport. The method uses a View Manager, having at least a one-dimensional grid and two scrollable image viewers. The grid corresponds to related document data for navigation to related documents. The View Manager is electronically linked with the electronic document storage device to retrieve, inter-relate, annotate and manage the documents.

In yet another alternative embodiment of the present invention, provided is a method of creating and using a View Manager, running on a portable electronic device, comprising the steps of, coding electronically stored documents and related document data. The coding is accomplished through at least two scrollable-image-viewers and caching the electronically stored documents. The method further comprises the steps of loading the coded electronic documents onto an electronic document storage device associated with the portable electronic device, and archiving the electronically stored documents in the at least one-dimensional grid for viewing. The grid is at least one-dimensional and corresponds to relevant document fields for navigation to related documents. Further comprising the step of inter-relating each archived document with other related documents on the at least one-dimensional grid. This embodiment of the present invention provides the user the ability to navigate from the archived document, currently being viewed, to the related documents using one or more navigation buttons on the portable electronic device.

Also provided herein is a portable dataport for document retrieving, inter-relating, annotating and management comprising an electronic document storage device associated with the portable dataport, for storing a population of coded electronic documents. Further provided is a View Manager, having at least a one-dimensional grid, the grid corresponds to related document fields for navigation to related documents. The View Manager is electronically linked with the electronic document storage device to retrieve, inter-relate, annotate and manage the documents. The electronic document storage device can be external or internal to the portable dataport in various embodiments. The View Manager of the present invention can optionally use a two, three or more dimensional grid.

The portable dataport is preferably a tablet personal computer, a notebook personal computer or a desktop personal computer and retrieves documents preferably through a design grid view and/or a design details table view. The portable dataport allows a user to toggle back and forth from a currently viewed document to a previously viewed document. Further, the portable dataport has a Snapshot, a Bookmark, an action items list, and a Permanent Record Annotation Layer component. The Snapshot, Bookmark and Permanent Record Annotation Layer are represented and recorded as a transparent overlay of currently viewed document such that annotations can be made to the document. The portable dataport can not only create the action items list, but also has the ability to organize it.

The present invention further comprises the ability to inter-relate and electronically link Permanent Record Annotation Layers, action item lists, Snapshots and Bookmarks together to create a field request for information and use an optional field communication tool to track and communicate a field request for information to intended recipients.

The portable dataport further comprises components to wirelessly synchronize itself to a remote, host server to provide the ability to download real-time documents. This wireless synchronization is used to access and store up-to-date secondary project elements, such as users, contacts, security access, software and developmental tools. Additionally, the portable dataport has a materials ordering component for use while still in the field. The portable dataport can also take photographs and recognize human voice input.

While the invention is specifically described with reference to the construction industry, it is not limited to such and is applicable in many other fields and industries where electronic document retrieval, inter-relation, annotation and management is needed or helpful.

DETAILED DESCRIPTION OF THE PREFERRED EMBODIMENT

Figure 1:
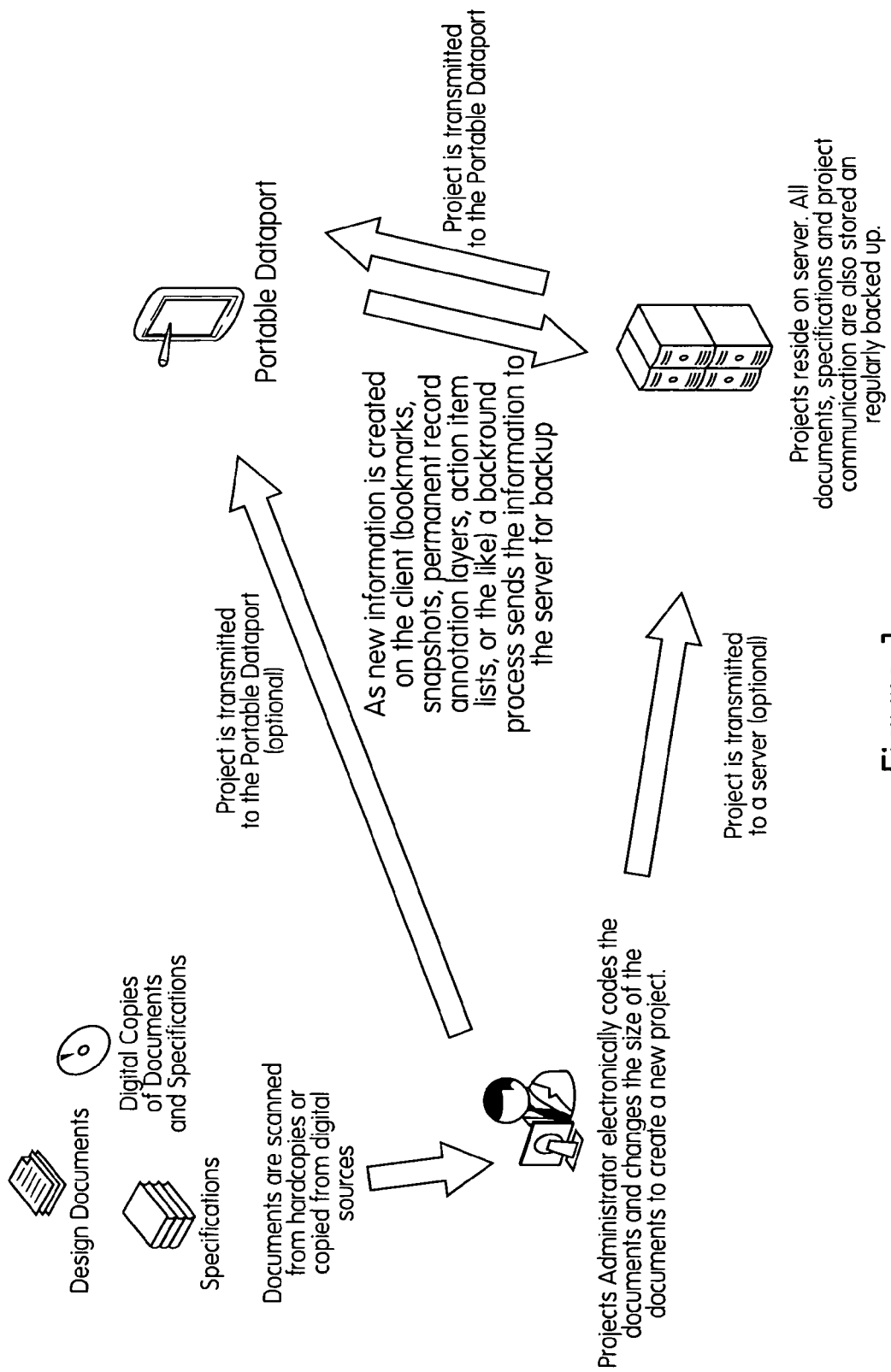
FIG. 1 is a flow diagram describing the steps the present invention employs to convert a paper or electronic document to an archived, retrievable, inter-related, manageable electronic document. The flow diagram further shows how the document is then transmitted to the optional server and/or loaded on and/or downloaded to the portable dataport of the present invention.
Figure 2:
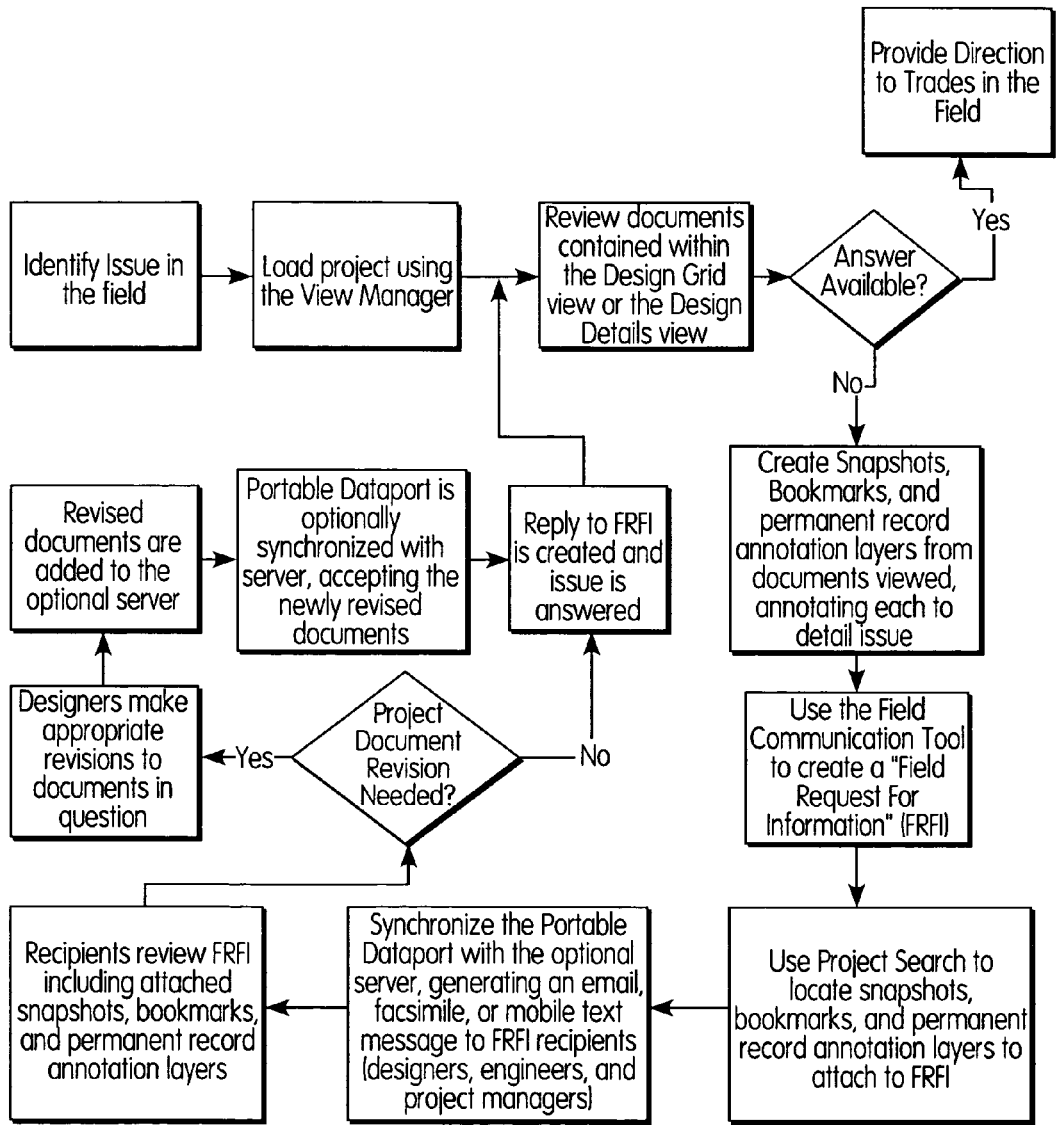
FIG. 2 is a flow diagram showing the functionality of the present invention.

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated device and method, and such further applications of the principles of the invention illustrated herein, as would normally occur to persons skilled in the art to which the invention relates.

Any reference to a "document", "image" or "sheet" in the below description refers to documents, sheets, meeting minutes, sketches, drawings, images, records, data compilations, x-rays, correspondence, notes and/or any other documents being used in a particular industry, field or area.

FIGS. 1-31 demonstrate the portable dataport and the method of the present invention, in various embodiments, that the user follows to solve informational issues at a particular site or for a particular project. By using the present invention, the user keeps the field operations moving and progressing each day. The present invention though the use of its View Manager (described below), specifically provides efficiency for field installation labor by readily providing the missing information to field superintendents and reducing the need to relocate workers to another work area due to missing necessary information. In sum, the portable dataport of the present invention permits the field staff or other personnel to work more effectively, completely, and efficiently.

In general, before the electronic document storage device associated with the portable dataport can be loaded, a population of documents first is converted into an electronically codeable format. Next, the electronic documents are coded with document data using an at least one-dimensional grid. Each dimension of the grid system corresponds to relevant electronic document fields. Then, the electronic documents are loaded onto, or otherwise transmitted to, the electronic storage device associated with the portable dataport of the present invention. The electric document storage device is either internal or external to the portable dataport. The portable dataport then interacts with the electronic document storage device, through a View Manager, to retrieve, review and communicate notations, changes and comments to the coded electronic document data. The portable dataport can optionally be a tablet personal computer, a notebook personal computer, a portable or any other computer or electronic device that can provide document viewing, retrieval, inter-relation annotation, management and transmission.

The present invention can also allow personnel on the project team to work more efficiently due to clearer communications regarding the requested information. In particular, alternative embodiments of the present invention provide time saving opportunities to its users in identifying problems by using the steps of: investigating an immediate solution to the problem with the electronic documents that are loaded onto the electronic document storage device associated with the portable dataport; requesting information from a remote interested party, showing the party where the answer was previously sought in the available electronic documents; and, requesting an answer from the remote interested party. A process that could take several hours to several days is now greatly shortened.

As set forth above, a key feature of the present invention is the View Manager (see e.g., FIGS. 5, 6, 7 and 11). This feature inter-relates documents to each other, by trade, by floor or the like, in the construction industry, or other criteria in other industries, to allow a user to easily navigate from a currently viewed document to surrounding or related documents, areas, fields or trades. For example and not by limitation, the View Manager can inter-relate a document to other related documents for the floors above and below (or areas adjacent) in the same trade or optionally in a different trade or area. The View Manager feature can also relate a document to another trade on the same floor.

Figure 5:
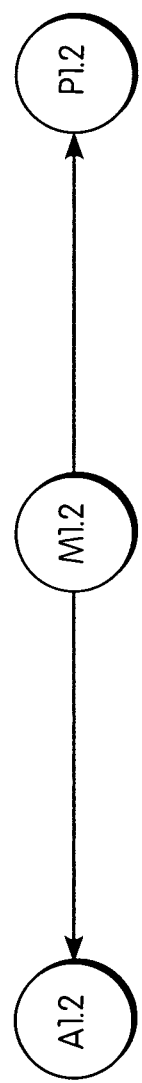
FIG. 5 is an example of the one-dimensional View Manager grid of the present invention.
Figure 6:
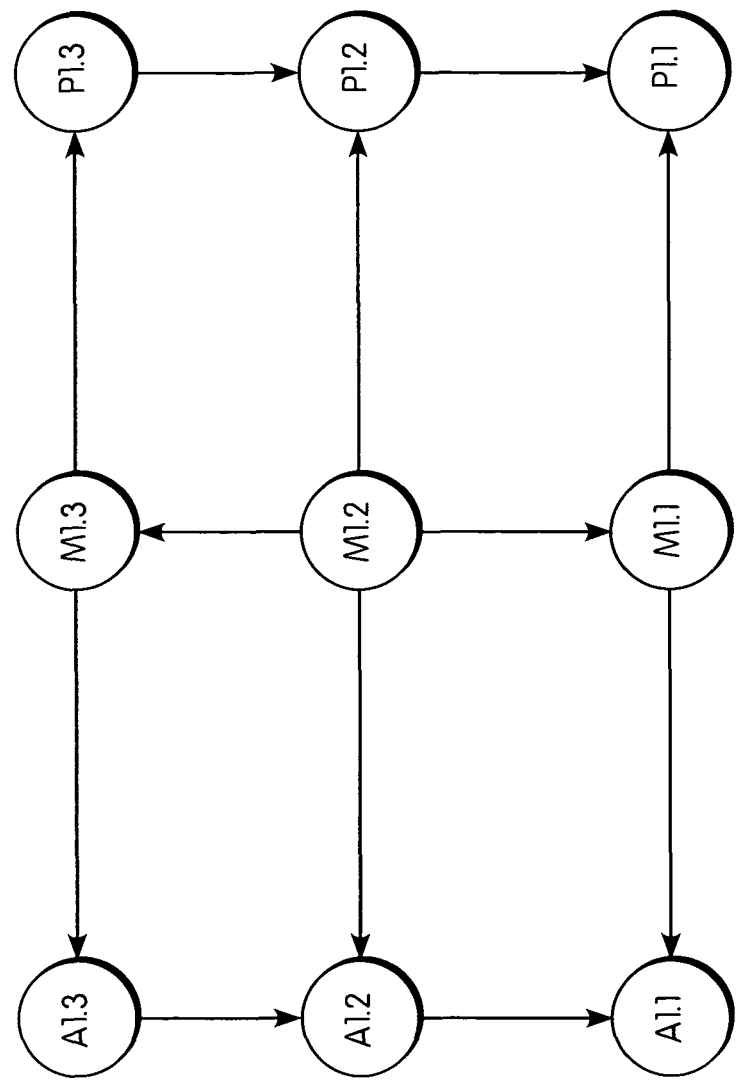
FIG. 6 is an example of the two-dimensional View Manager grid of the present invention.

The document inter-relationship software and/or methodology of the present invention, known as the View Manager, logically organizes the documents of a project into an at least one-dimensional grid (see FIG. 5). In another preferred embodiment, a two-dimensional grid is shown in FIG. 6. This grid, in yet another preferred embodiments, can have three (see FIG. 7) or more dimensions in order to suit any application in any industry or field. The View Manager uses a series of scrollable-image-viewers and a caching methodology to pre-load documents connected to the currently viewed image.

As an example and not by limitation, FIG. 5 shows a one-dimensional project representation by trade. Assume the user selected the M1.2 document to view. The M1.2 document is retrieved from the file system and displayed to the user in a scrollable-image-viewer. The connected documents, in this case A1.2 to the West, P1.2 to the East are all loaded in the background and placed in their own scrollable-image-viewer. If the user chooses to navigate to one of these connected documents, the additional scrollable-image-viewer is shown to the user, effectively removing any lag time due to loading a desired image from the file system.

Assume that the user has elected to navigate from the M1.2 document to the East. The scrollable-image-viewer containing the P1.2 document is shown to the user. The scrollable-image-viewer containing the M1.2 document, the formerly displayed document is now labeled as the new West image and saved. The remaining documents previously loaded are now removed from memory because they can no longer be directly reached from the new document, P1.2. Since the document located at P1.2 is on the edge of the grid and no document exist to the East, that navigation button is disabled and the scrollable-image-viewer reserved for the East remains empty.

As an example and not by limitation, FIG. 6 shows a two-dimensional project representation by floor and by trade. Assume the user selected the M1.2 document to view. The M1.2 document is retrieved from the file system and displayed to the user in a scrollable-image-viewer. The connected documents, in this case A1.2 to the West, P1.2 to the East, M1.3 to the North, and M1.1 to the South are all loaded in the background and placed in their own scrollable-image-viewer. If the user chooses to navigate to one of these connected documents, the additional scrollable-image-viewer is shown to the user, effectively removing any lag time due to loading a desired image from the file system.

Assume that the user has elected to navigate from the M1.2 document to the East. The scrollable-image-viewer containing the P1.2 document is shown to the user. The scrollable-image-viewer containing the M1.2 document, the formerly displayed document is now labeled as the new West image and saved. The remaining documents previously loaded are now removed from memory because they can no longer be directly reached from the new document, P1.2. However, the scrollable-image-viewers of these now orphaned documents are reused and loaded with the documents connected to P1.2, specifically, P1.3 to the North, and P1.1 to the South. Since the document located at P1.2 is on the edge of the grid and no document exist to the East, that navigation button is disabled and the scrollable-image-viewer reserved for the East remains empty.

Figure 7:
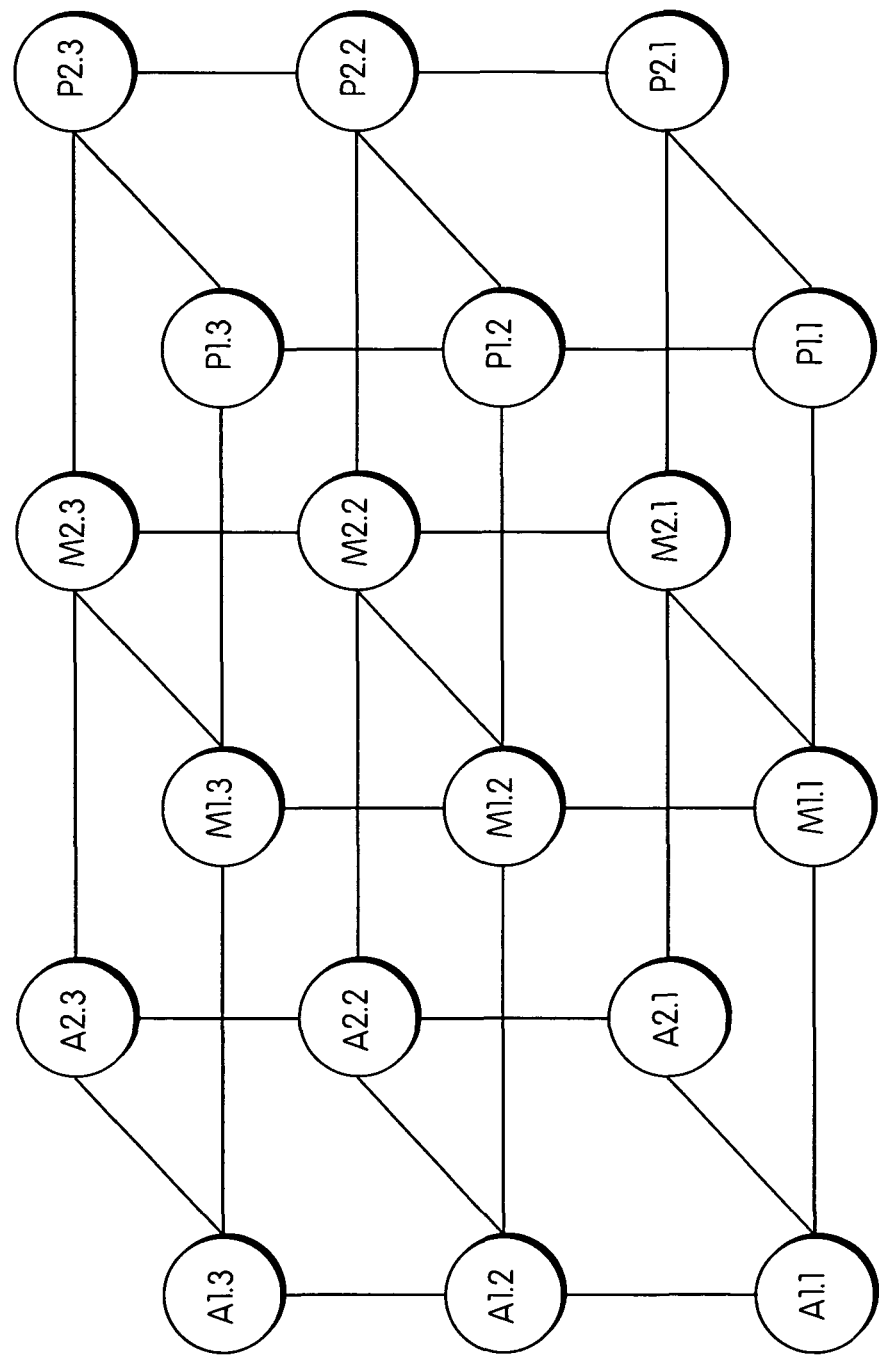
FIG. 7 is an example of the three-dimensional View Manager grid of the present invention.
Figure 8:
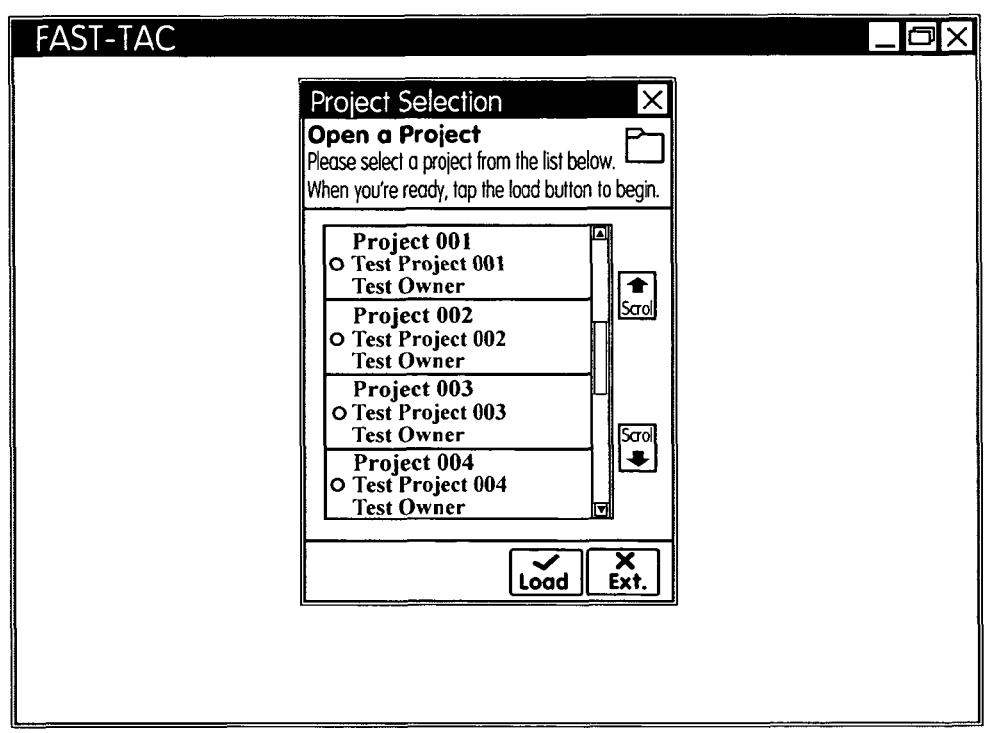
FIG. 8 is an example of a screenshot of a project selection dialog of the present invention.
Figure 9:
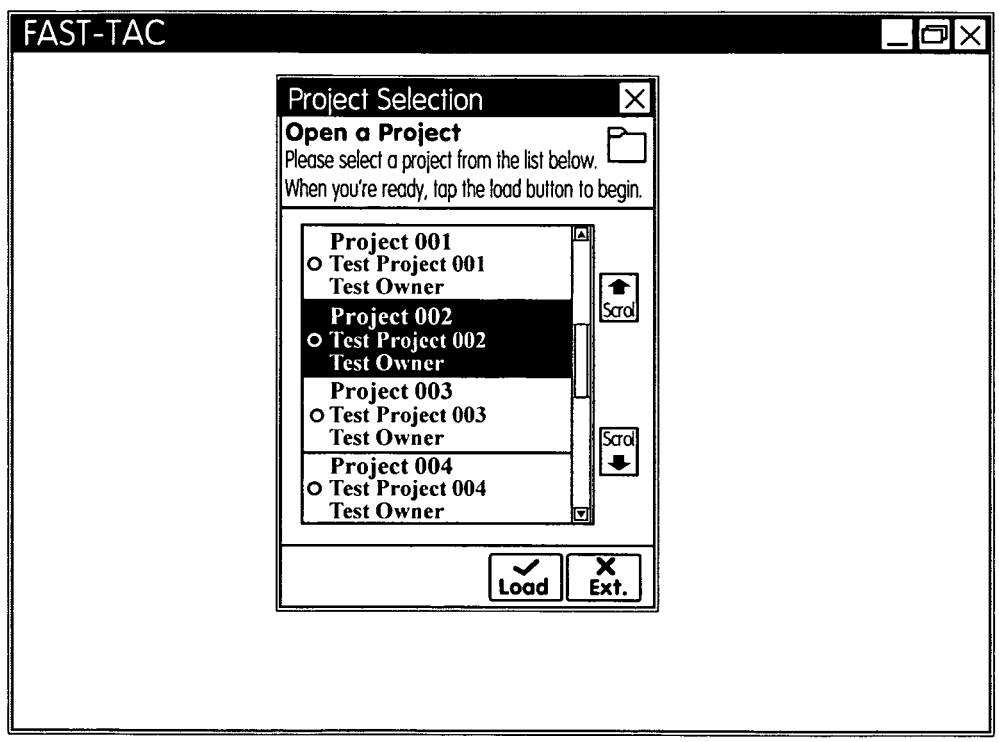
FIG. 9 is an example of a screenshot of a project being selected by a user.
Figure 10:
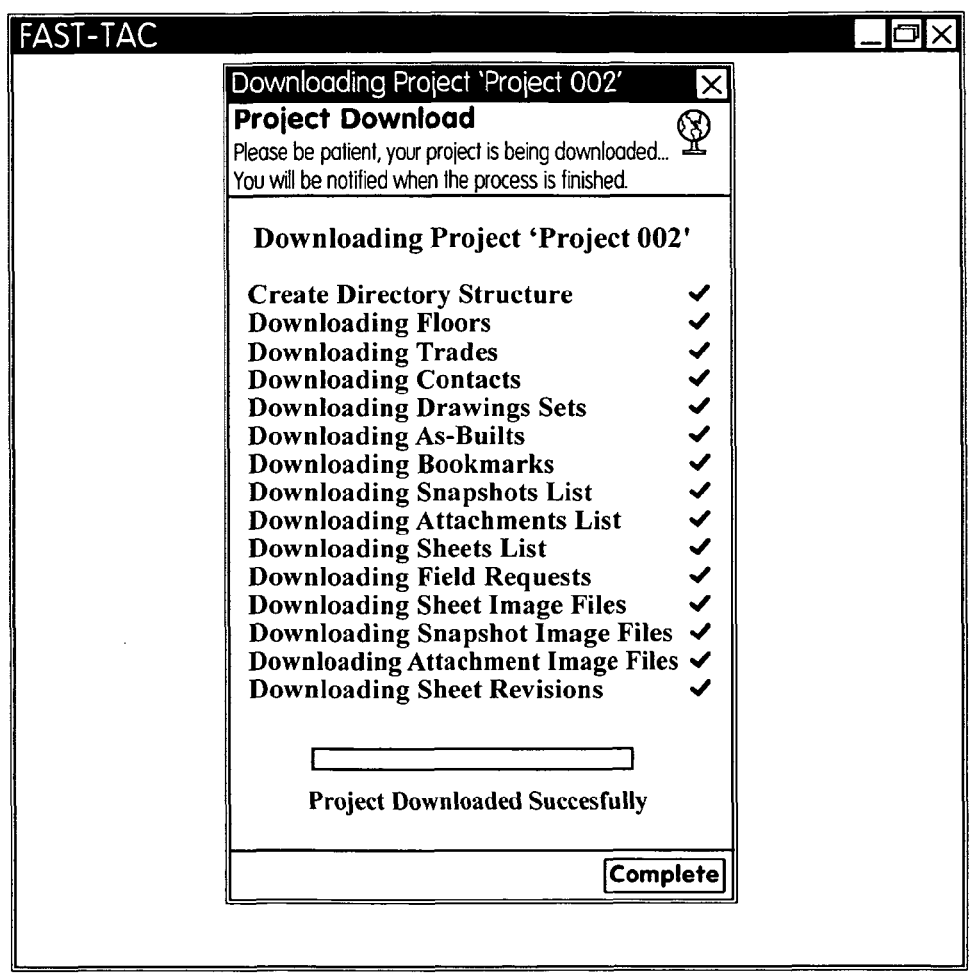
FIG. 10 is a screenshot of a project being loaded onto the portable dataport, or synchronized with an optional server. Optionally, the project can be loaded directly to the portable dataport.
Figure 11:
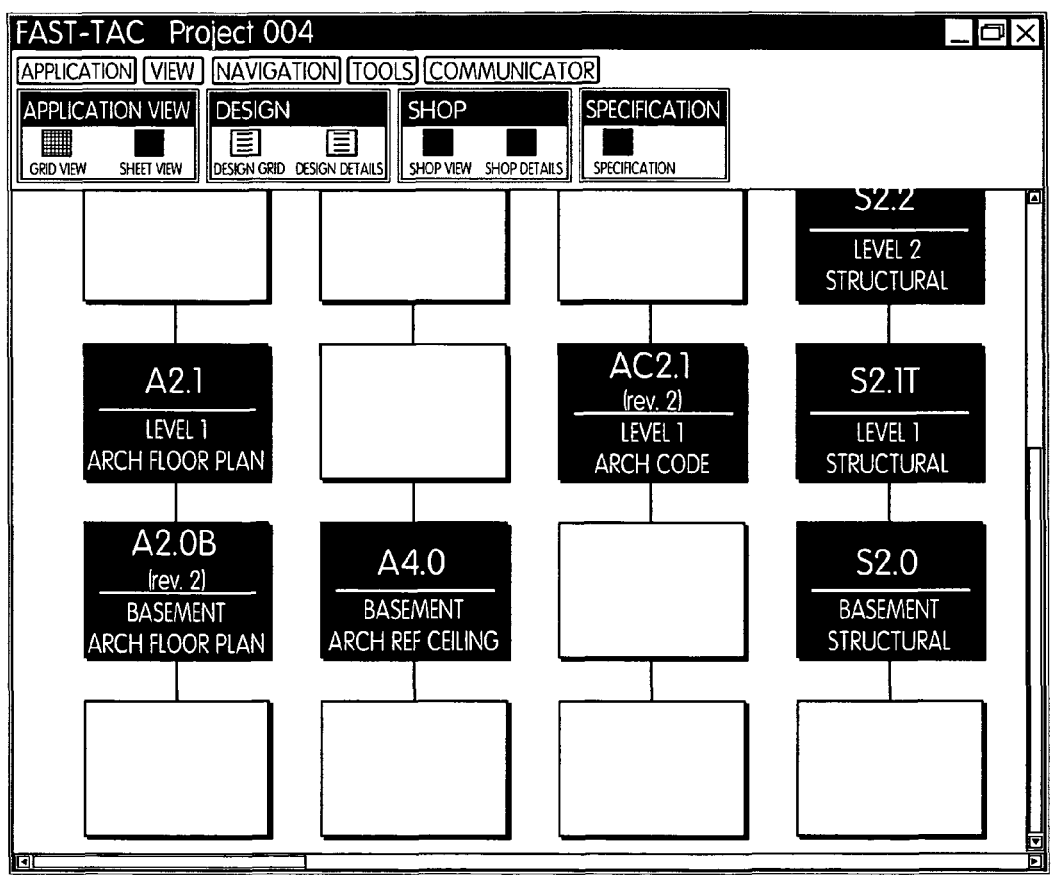
FIG. 11 is an example of a screenshot of a grid view of the View Manager of the present invention.
Figure 12:
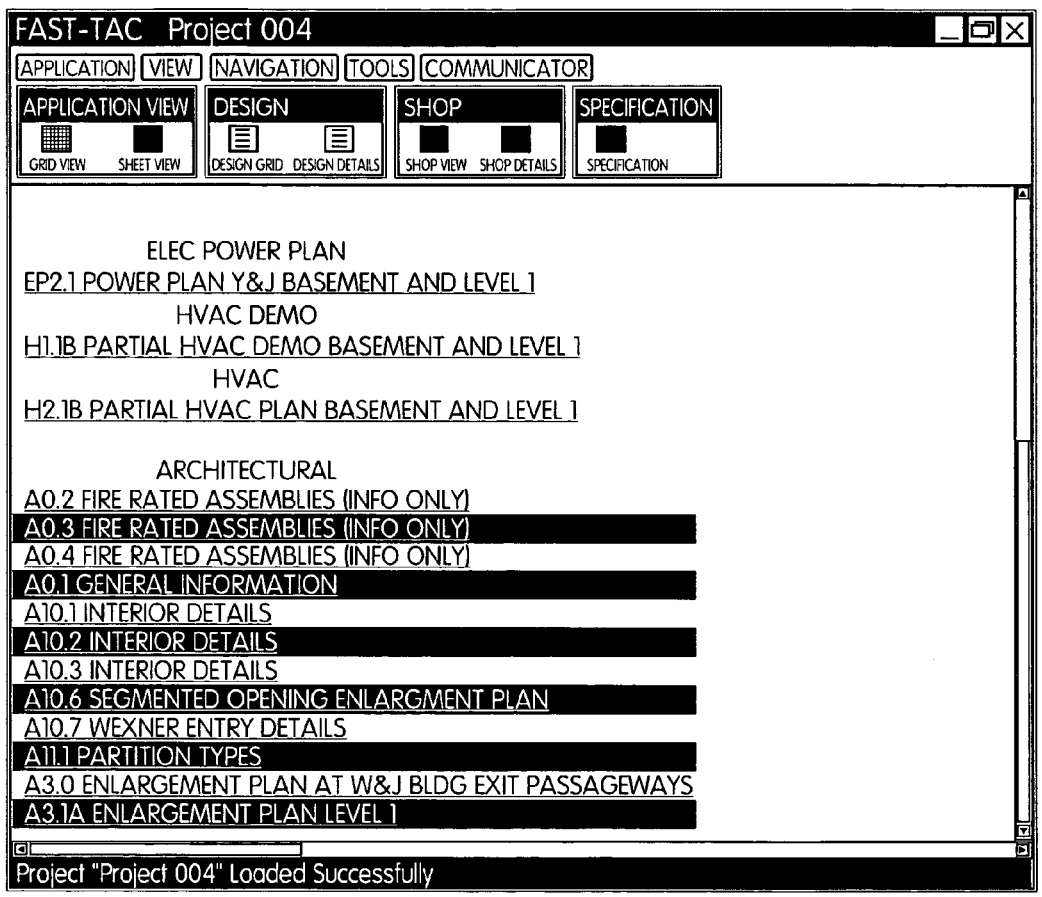
FIG. 12 is an example of a screenshot of a table details view of the View Manager of the present invention.
Figure 13:
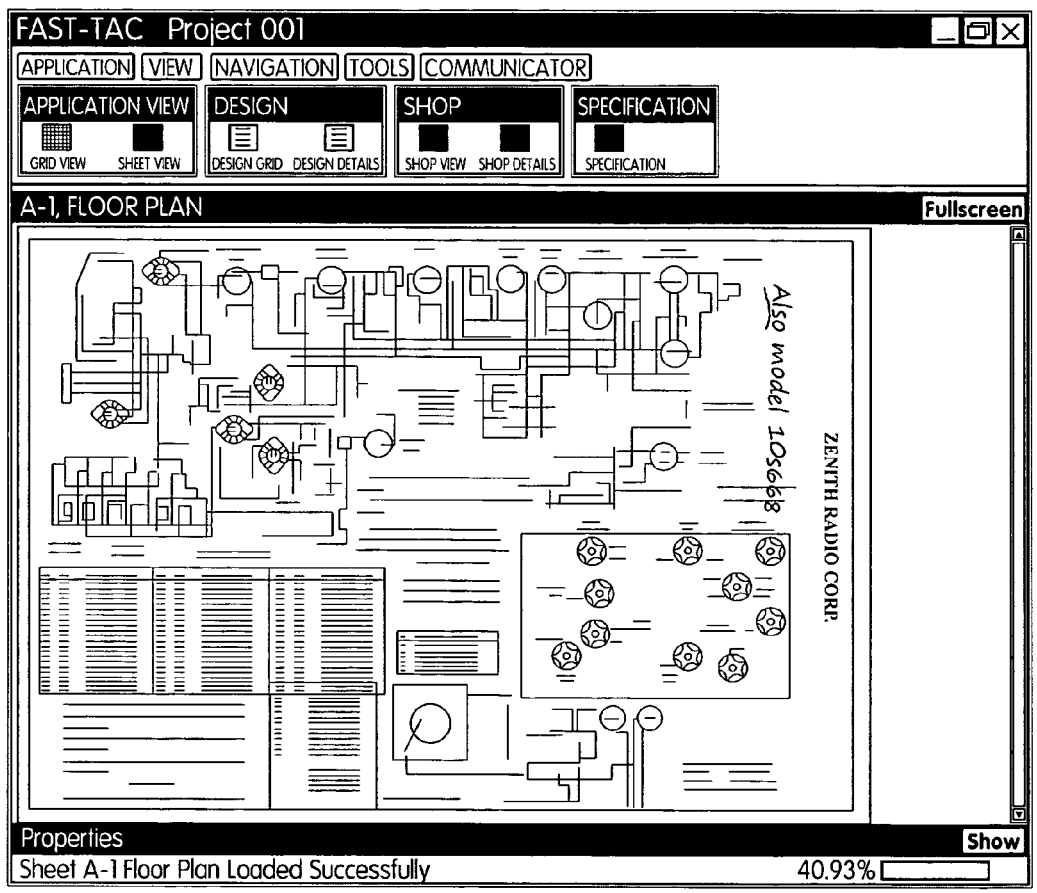
FIG. 13 is an example of a screenshot of the View Manager of the present invention showing a loaded image.
Figure 14:
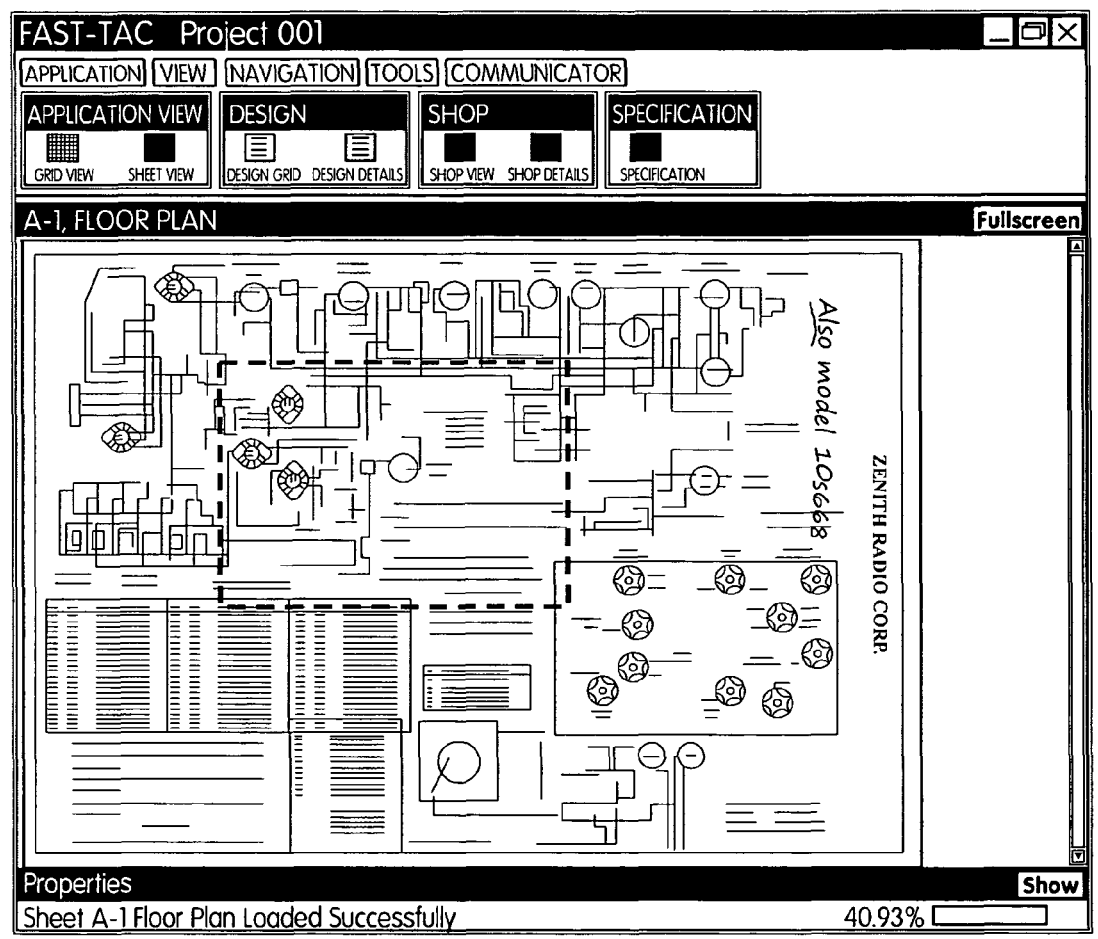
FIG. 14 is an example of a screenshot of the View Manager of the present invention displaying the zoom feature.

As an example and not by limitation, FIG. 7 shows a three-dimensional project representation by floor, by trade and by shop or design drawings. Assume the user selected the M1.2 document to view. The M1.2 document is retrieved from the file system and displayed to the user in a scrollable-image-viewer. The connected documents, in this case A1.2 to the West, P1.2 to the East, M1.3 to the North, M1.1 to the South, and M2.2 to the forward direction are all loaded in the background and placed in their own scrollable-image-viewer. If the user chooses to navigate to one of these connected documents, the additional scrollable-image-viewer is shown to the user, effectively removing any lag time due to loading a desired document from the file system.

Assume that the user has elected to navigate from the document located at M1.2 to the East to the P1.2 document. The scrollable-image-viewer containing the P1.2 document is shown to the user. The scrollable-image-viewer containing the M1.2 document, the formerly displayed image, is now labeled as the new West document and saved. The remaining previously loaded documents are now removed from memory because they can no longer be directly reached from the new document, P1.2. However, the scrollable-image-viewers of these now orphaned documents are reused and loaded with the documents connected to the P1.2 document, specifically, P1.3 to the North, P1.1 to the South, and P2.2 to the forward direction. Since the P1.2 document is on the edge of the grid and no image exists to the East, that navigation button is disabled and the scrollable-image-viewer reserved for the East remains empty.

Each document within a given project is represented within the View Manager software of the present invention, by a data structure, known in Java language as a Bean. Each document Bean contains meta-data about the given document as well as the absolute path to the actual image file located within the user's local file system. When the database is queried for information on a given document, a document Bean is returned. The document, however, is preferably not loaded into memory at the time of database query.

The present invention makes use of Java's ability to create threads that run in the background without the knowledge or direction of the user. A thread is a program's path of execution. Java language allows for a multi thread environment even though there may only exist one processor within the computer, portable dataport or like device itself. Within a graphical environment, Java reserves 1 thread, known as the event thread, for painting and updating of the user interface.

In addition to meta-data about the document itself (name, number, coding etc.), each document Bean optionally contains 1 or more references to Snapshots, 1 or more references to Bookmarks, 1 or more references to as-built layers or Permanent Record Annotation Layers, and 1 or more references to punch-lists, action item lists, or, in a construction setting, the present invention permits these several types of notes or markings to be "drawn" onto or attached to the document in a transparent layer format. These notes or markings include, but are not limited to, a Snapshot, a Bookmark and an As-Built and/or Permanent Record Annotation Layer. All of these notes or markings can be annotated by the user.

Figure 16:
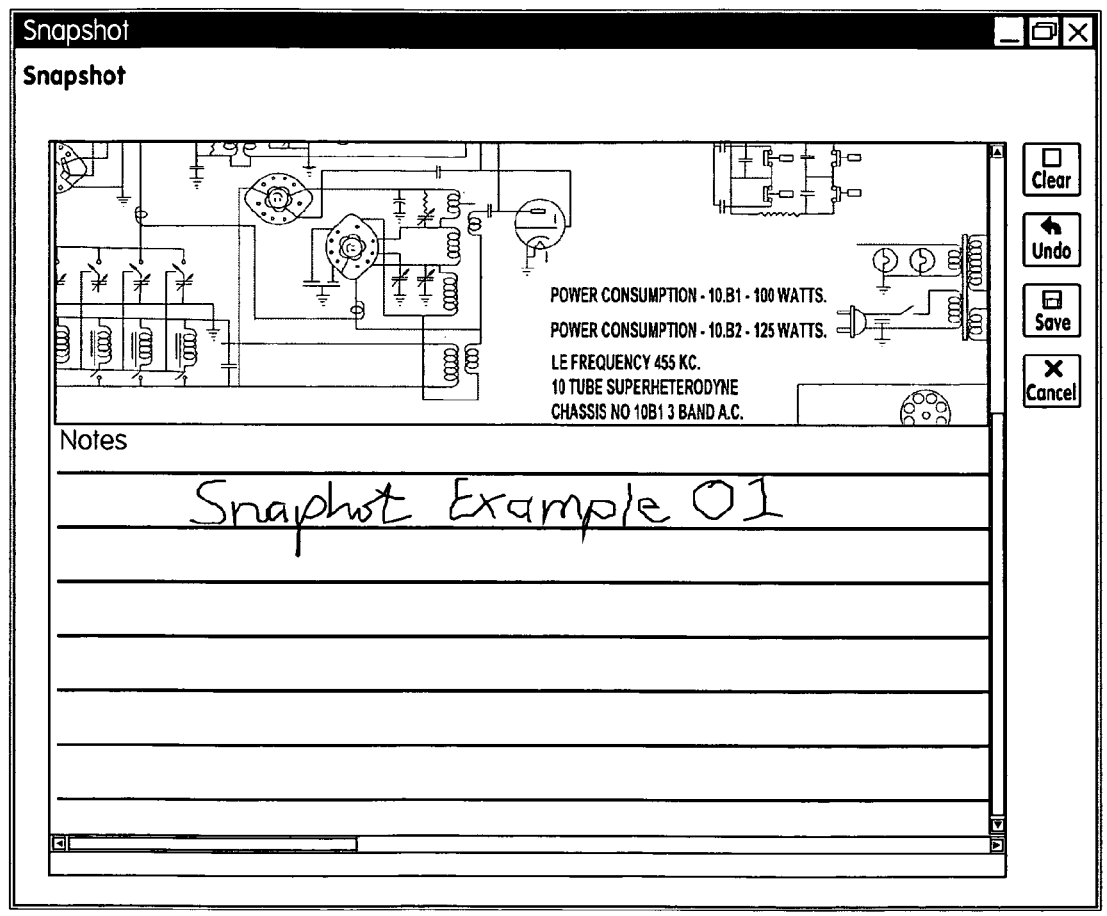
FIG. 16 is an example of a screenshot of the View Manager of the present invention showing the Snapshot feature.
Figure 17:
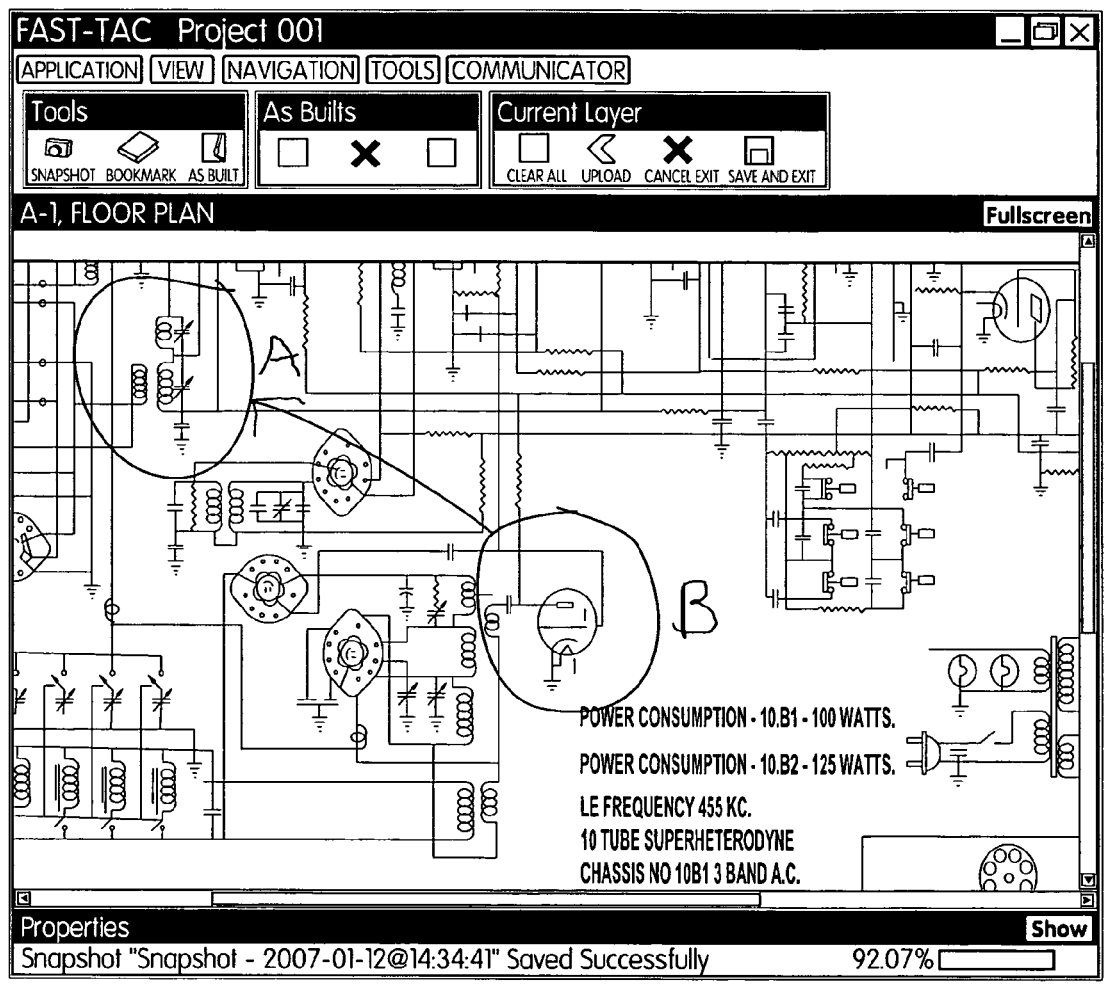
FIG. 17 is an example of a screenshot of the View Manager of the present invention illustrating the creation of a Permanent Record Annotation Layer.

Snapshots are images derived from portions of the original document (see FIG. 16). These Snapshots are displayed in their own window within the View Manager. Essentially, they provide an invisible or transparent drawing layer on top of and attached or linked to the document, allowing the user to virtually annotate the document, while keeping the original document image in tact. An additional area is provided below the document for further notes (see FIG. 16). The Snapshot feature specifically identifies the location and magnification of detail of the document, creates a copy of the document and permits annotation on that particular portion of the document. The Snapshot feature is essentially a working version of the document stored on a separate transparent layer connected to a particular portion of the document. Snapshots are generally not permanently attached to a document, but only attached until the issue, causing the Snapshot to be taken, is resolved. However, even after these Snapshots are resolved and unattached from the document, they are still permanently saved and tracked for record keeping purposes.

Figure 15:
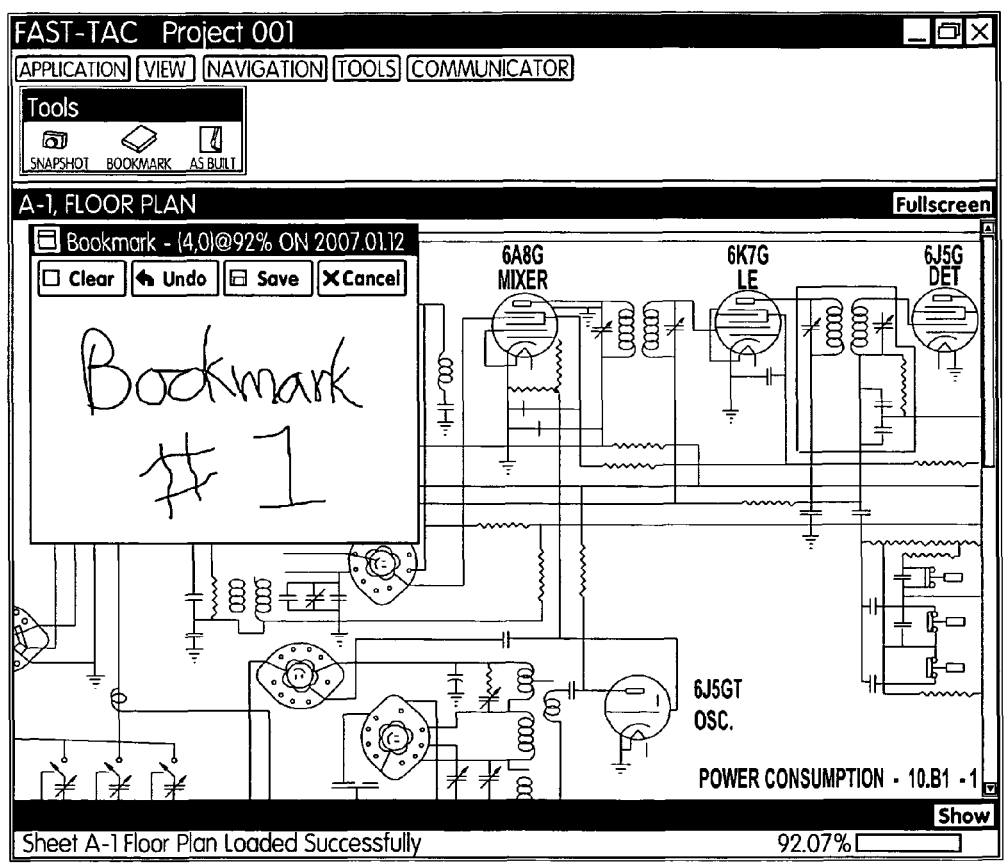
FIG. 15 is an example of a screenshot of the View Manager of the present invention showing the Bookmark feature.

Bookmarks act as sticky notes or transparent layers affixed to the original document (see FIG. 15). These bookmarks allow the user to make notes and annotations on the sticky note or transparent layer itself rather than on the original document. Bookmarks retain information about their position on the document they modify, as well as the scale of the document at the time of Bookmark creation. Bookmarks, once saved, are hidden from view in ordinary circumstances, but are still accessible through a document properties panel.

As-built layers or Permanent Record Annotation Layers act as another invisible or transparent layer that is placed directly on or attached to the document itself (see FIG. 15). The user can annotate the as-builts, or Permanent Record Annotation Layers, without affecting the original document or image. Once saved, the invisible layer is hidden from view but is still accessible through a document properties panel. Unlike the other two note or layer features mentioned above, this marking, optionally, is permanent and stays with the document for printing and turnover to the client, owner or other individual or entity.

The present invention further permits the naming of these notes and markings (see FIG. 22) to allow the user to send them as attachments to other personnel in the contractor's, architect's, engineer's, owner's and/or subcontractor's offices through use of the field communication tool (see FIGS. 23-30) or FRFI. Also included is a screen feature that provides for the displaying of all of these notes or markings items on the same document (see FIG. 22).

The View Manager is preferably responsible for four distinct tasks, namely, 1) project loading, 2) loading a document not already cached, 3) loading a document that has been cached, and 4) zooming the currently displayed document. Each task is discussed in further detail below. The zooming step can optionally be eliminated from the View Manager and the View Manager will still function as intended and still be within the scope of the present invention. There tasks are discussed more fully below.

Project Loading

The unique key for the project is passed to the View Manager and all documents for the project are returned from the database and/or electronic document storage device. Each document has an x, y, and optionally a z coordinate assigned to it during project creation, using the admin-console. In a one-dimensional project, one of the x or y values is set to one and the z value is eliminated, so that a methodology of project creation is the same, with respect to the x or y values, as a two or more dimensional grid. In a two-dimensional project, only one of the x, y or z values is set to one, so that a one, three or more dimensional project is created using the same methodology. In a three or more dimensional project, the x, y and z (and others for dimensions 4, 5, 6, etc.) coordinates have a value and are not equal to one.

A Hashmap, which is a data structure that stores information in a key/value pair, is then created containing each document Bean returned from the database and/or electronic document storage device. Each document Bean uses a concatenation of its x, y, and z coordinates, hereafter referred to as the NavigationKey, as its key within the map. This map is hereafter referred to as the MasterDocumentMap.

In the three-dimensional embodiment, for example and not by limitation, once the project is loaded from the database, seven scrollable-image-viewers are created, one for the currently viewed document and one representing each direction reachable from the current image: North (+1 on the y-axis), South(−1 on the y-axis), East(+1 on the x-axis), West(−1 on the x-axis), forward (+1 on the z-axis), and backward(−1 on the z-axis). The directions on the each various axis can be changed to suit a particular application. A two-dimensional version does not have scrollable-image viewers along one of the x, y or z-axis and therefore this embodiment comprises only five scrollable image viewers. In a one-dimensional project there would be three scrollable-image viewers, one for the currently viewed document and two for movement along one of the x, y or sometimes optionally the z axis.

Any other number of scrollable-image-viewers can be used for any number of dimensions needed in a particular project and still be within the scope of this invention.

Next, a Hashmap hereafter referred to as the MapScrollPanes, is created containing each of the scrollable-image-viewers, with a key equal to the number of the given scrollable-image-viewers (i.e. key="scrollable1", value=scrollable-image-viewer #1). A second Hashmap is also created, hereafter referred to as MapKeys, containing the "cardinality key" (North, South, East, West, backward and forward in a three-dimensional embodiment) (preferably North, South, East and West in a two-dimensional embodiment and only North and South or East and West in a one-dimensional embodiment) as the keys with the values being the keys used in the MapScrollPanes' Hashmap.

Finally Java's Cardlayout is used to layout the three, five, seven or other number of scrollable-image-viewers into a single panel. Cardlayout acts as a Hashmap of sorts, requiring a key value for each component added. These components are then stacked on each other so the user only sees a single component. The present invention uses the keys from the MapScrollPanes' Hashmap as the keys to the Cardlayout. In addition to the three, five, seven or other number of scrollable image viewers, an empty panel is added as the fourth, sixth, eighth or other numbered card with a special key that is not to be a part of any of the Hashmaps discussed above. This empty panel is used as a device to keep the user interface clean. Additionally, the empty panel is used to hide the zooming and scrolling which might cause the document image to appear temporarily distorted. Once the document image is appropriately zoomed and scrolled to the appropriate position, the empty panel is hidden, exposing the desired document image.

Loading a Document not Currently Cached

Figure 4:
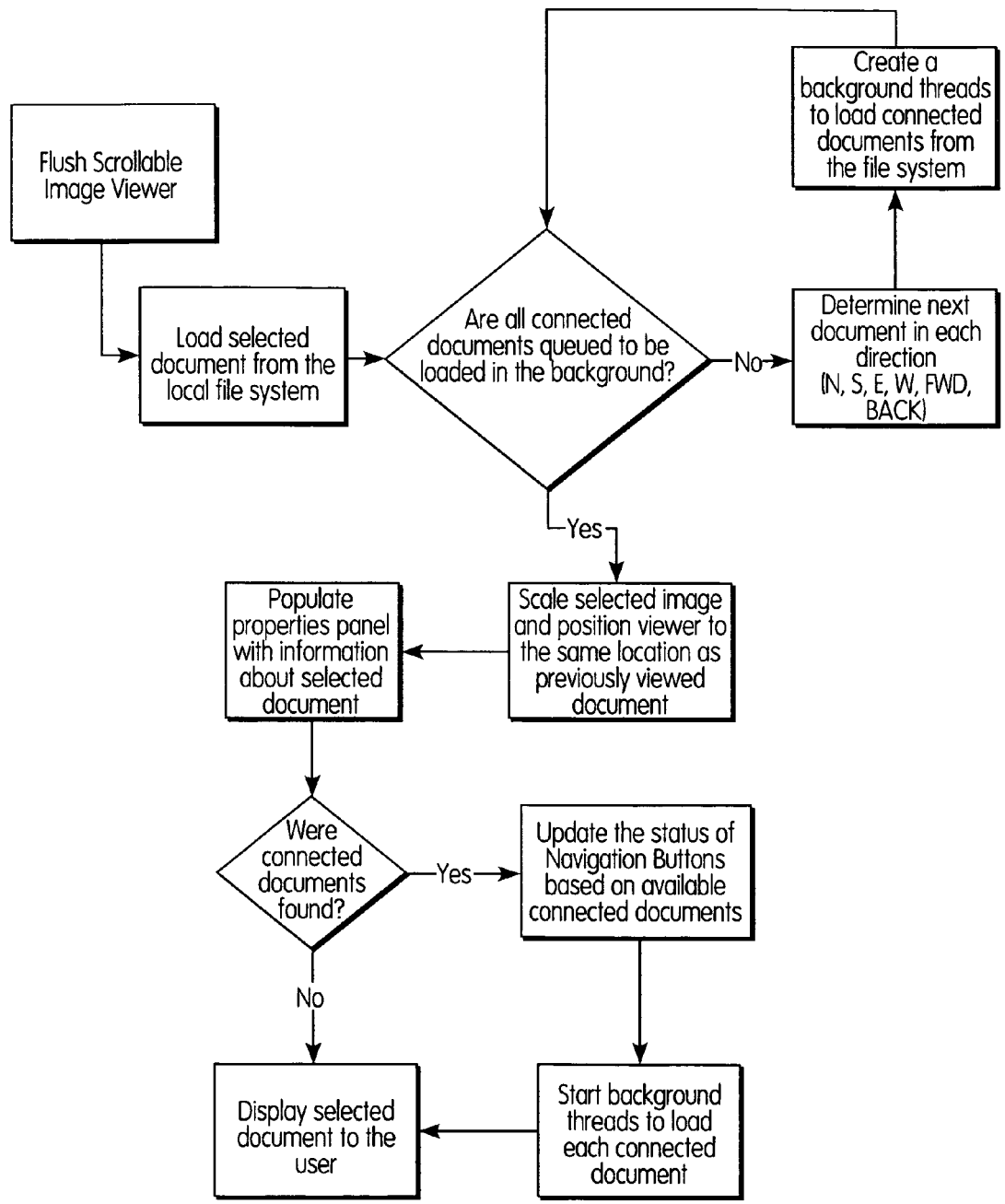
FIG. 4 is a flow diagram showing the steps involved in loading a non-cached document into the View Manager of the present invention.

The following discusses the steps involved with loading a document that is not currently cached (see generally FIG. 4). The document is then retrieved from the file system, scaled to fit the viewable area and displayed to the user. In addition, the documents that are directly connected to the selected document are found and loaded from the file system as well. This method is invoked in several ways: 1) a document's icon is clicked within the grid view or the details view; 2) when the document is selected from the quick-jump dialog box, the user is allowed to select any document within the given project; and, 3) when a Bookmark, Snapshot, as-built layer and/or Permanent Record Annotation Layer is selected for viewing, the associated document is loaded, scaled, and scrolled to the appropriate viewing position. A reference to the selected document is passed to the View Manager, and then the following steps occur:

Reference to the passed document Bean is saved internally as the currently viewed document.

The main viewable panel is flipped to the empty card.

All as-built layers, or more generally, Permanent Record Annotation Layers and Bookmarks are cleared from the scrollable-image-viewers.

The document Bean referenced by the currently viewed document reference is loaded. This consists of passing the referenced document Bean to the View Manager, which in turn, determines the type of resource the given document references (jpg, gif, tiff or the like) and calls the appropriate document image loading mechanism to properly load the document's image into memory.

An array of preferably two, four or other number of background threads (depending on whether the project being loaded has one, two, three or more dimensions) is setup, hereafter referred to as the BackgroundLoadTasksArray. Each thread represents one direction away from the currently viewed document. This consists of the following:

Using the NavigationKey of the document referenced by the currently viewed document, increment or decrement the appropriate x, y, or z value by 1 and search the MasterDocumentMap for a match. If a match is not found, increment or decrement the value again and recheck. Continue this loop until a specified threshold has been met (preferably the number of documents in the project).

If a match is found for the generated NavigationKey, instantiate one of the worker threads for the document is referenced by the new NavigationKey. The background thread loads the image referenced by the document in the same manner described above. This thread is only created in this step. It is not to be started at this time.

An array of two, four, six or other number of Boolean flags are also created, hereafter referred to as NavButtonsStatusArray, representing each direction (e.g. N, E, S, W, FWD, REV, depending again on how many dimensions the project requires) from the currently viewed document. As connected drawings are found and background threads are instantiated, the Boolean flag for that direction is set to true. This array is used to enable/disable the navigation buttons on the toolbar.

The size of the viewable area is determined and the document is scaled so that it appropriately fits the screen.

The properties panel is populated with the meta-data for the document referenced by the currently viewed document.

The status of the navigation buttons is updated based on the values in NavButtonsStatusArray.

The document's image for the document referenced by currently viewed document, now in memory, is painted in the appropriate subclass of the AbstractView. This subclass is then placed inside the scrollable-image-viewer reserved for the currently viewed document.

Next, determine if any Bookmark, as-built layer or Permanent Record Annotation Layer was selected to view. If so, load with the Bookmark window, if necessary, and scroll and scale the document to that of the last save of the Bookmark, as-built layer or Permanent Record Annotation Layer.

Then, flip the main viewable panel from the empty card to the card holding the scrollable-image-viewer reserved for the currently viewed document.

Finally, start any threads within the BackgroundLoadTasksArray. These background threads are subject to the rules governing the pool of threads currently available within the application.

Loading a Document Currently Cached

Figure 3:
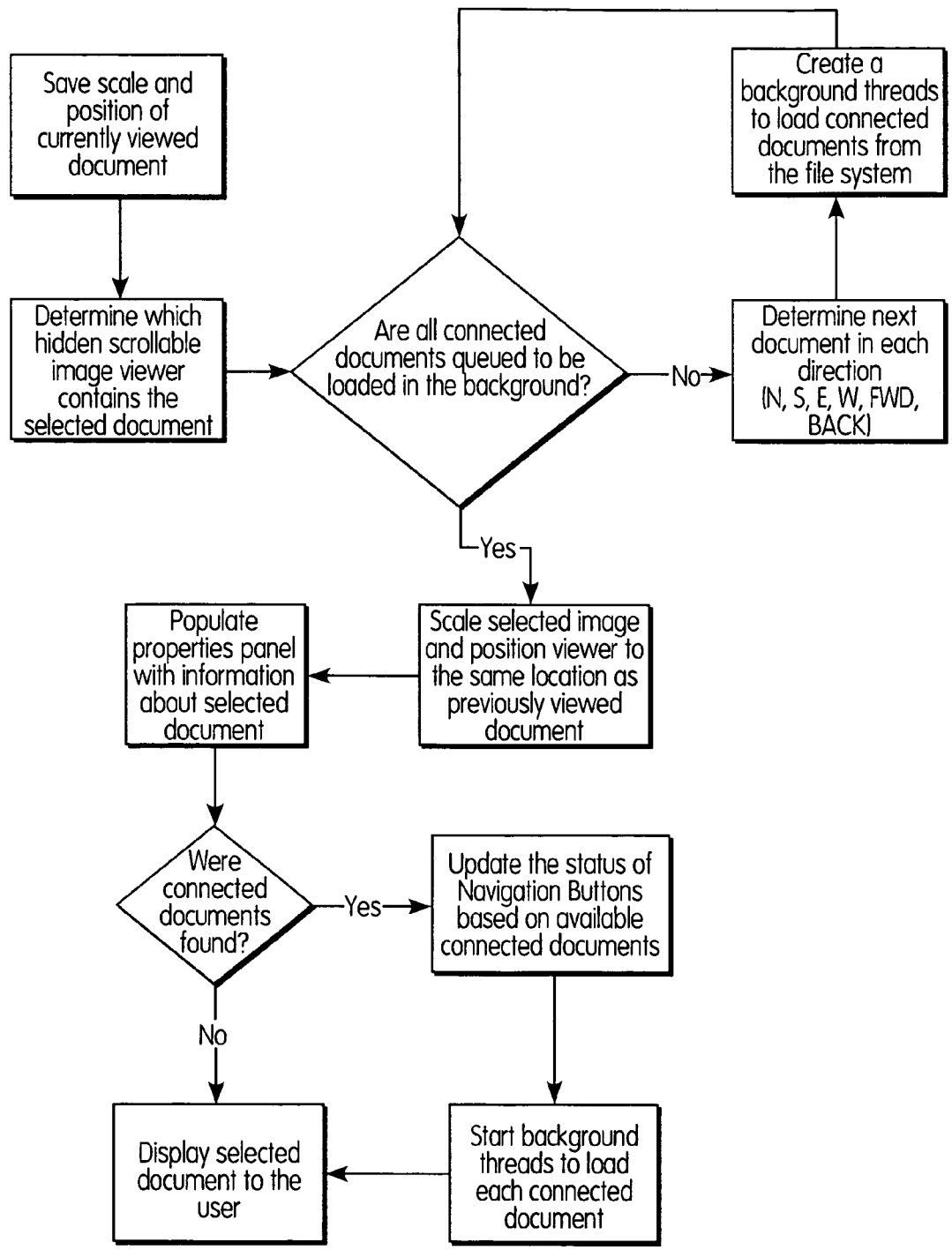
FIG. 3 is a flow diagram showing the steps involved in loading a cached document into the View Manager of the present invention.

This method is used when the user has chosen to navigate to one of the documents connected to the currently viewed document that has been already loaded from the file system in a background thread (see generally FIG. 3). The following steps occur:

The scale of the currently viewed document is saved.

The (x, y) coordinate of the upper left corner of the viewable area is saved if the document is larger than the viewable area.

All as-builts or Permanent Record Annotation Layers and Bookmarks layers are cleared from the scrollable-image-viewers.

A new background thread is created.

All orphaned documents are unloaded. Orphaned documents consist of all documents previously loaded into memory that are not connected to the new document being viewed.

The MapKeys Hashmap is rearranged. For example, if the user chooses to navigate East, the cardinality key, referencing the scrollable image viewer holding the East document, now becomes the currently viewed document. The formerly viewed document now becomes the West document, and the formerly West document (now orphaned via the above step) is used to hold the future East document.

The reference held by currently viewed document is set to the new user chosen document.

The BackgroundLoadTasksArray is setup, as described above, using the NavigationKey of the new document referenced by the currently viewed document.

The properties panel is populated with the meta-data or other document data for the document referenced by the currently viewed document.

The status of the navigation buttons is updated based on the values in NavButtonsStatusArray.

The scrollable-image-viewer, currently holding the already loaded new document, is retrieved for the desired direction and the scale saved above is applied and the viewable area is scrolled to the (x, y) coordinates saved above.

The plumb-line correction value is adjusted, if available.

The main panel is flipped to the card containing the document for the desired direction.

Any background threads are started within the BackgroundLoadTasksArray. These background threads are subject to the rules governing the pool of threads currently available within the application.

Zooming the Currently Displayed Document (Optional)

The View Manager is responsible for all of the zooming features within the application. The actual image representing the currently viewed document is maintained in memory, preferably, at actual size (100%). The appropriate scale of the image is calculated, and a second image is created from the first, with the calculated scale applied. It is this second image that is painted in the scrollable image viewer. By generating a second image from the original image, the present invention does not experience any loss of clarity that would arise from scaling the same image multiple times. The calculated scale is saved internally and is used as a parameter in the calculations for the next zoom operation.

There are at least four optionally built in zooming operations that perform the calculations to determine the appropriate scale to pass to the algorithm described below.

Zoom-In—multiply the current scale by 1.25.

Zoom-Out—multiply the current scale by 0.8

Zoom-Box—based on the box created by the user, derive the scale by dividing the current viewable size in pixels in both the x and y direction by the x and y dimensions of the user created box. The scale used is the lesser of the two values; either the x or y.

Zoom-Fit—derive the scale by dividing the current viewable size of the document's image in pixels in both the x and y direction by the x and y dimensions of the image at actual size. The scale used is the lesser of the two values, i.e., either x or y.

Once the desired scale has been determined, the following steps occur, preferably, in order:

The main viewable panel is flipped to the empty card.

The future "display center point" is determined. Given the calculated scale and the current center point of the viewable area in relation to the overall image, multiply the x and y values by the scale.

A new image is generated based on the calculated scale and then the new image is painted into the scrollable image viewer.

The image is scrolled to ensure that the calculated "display center point" is centered within the viewable area.

The main viewable panel is flipped from the empty card to the card holding the scrollable-image-viewer reserved for the currently viewed image.

The status bar is updated with the new scale of the image.

To view a specific area of the document, a Zoom Box or magnification of detail tool is available. To use the Zoom Box, a user highlights the area of the document that he/she wants to see more clearly. The user can also, optionally, do several Zoom Box enlargements at any time and quickly navigate back to a full screen to locate another area quickly.

A few examples of how the present invention improves the related systems are provided below. These examples, while related generally to the construction industry, are not limited to the same and apply to other fields. The construction industry is merely used as a preferred embodiment herein and is not intended to limit the present invention's application specifically to the construction industry.

Example A

A sheet metal contractor is installing ductwork and comes to an area where the ductwork is supposed to occupy a space already occupied by the fire protection system and electrical conduit. Currently, this issue is brought to the attention of the field superintendent as he or she performs his or her daily walk-through. The field superintendent manually checks the date on the documents that the sheet metal contractor is using to be certain that they are using the latest revisions to the document. The field superintendent then retreats to the field office to check the date on the latest set of shop documents and checks the shop documents for the interfering fire protection and electrical construction. Once this lengthy process is completed, the field superintendent determines who has made the error and solves the problem by gathering the necessary contractors and returning to the location in the field where the conflict occurred. During this meeting, the electrical contractor and the fire protection contractor share the documents that each is using to build their respective aspect of the project, with the field superintendent. The field superintendent must then again return to the field office to again check the date on the shop documents of the electrical and fire protection subcontractors. If both contractors in this example are using the latest documents and a solution cannot be found, a request for information is made to the project managers of the affected contractors or to the general contractor.

Solution. The portable dataport and methodology of the present invention is designed to solve this litany of efforts by permitting the field superintendent to solve the problem while in the field or to ask the proper questions using the FRFI method initiated from the portable dataport of the present invention in the field. Thus, in example A above, if the ductwork contractor was installing duct work and came to an area where fire protection and electrical work was installed, the field superintendent is now able to retrieve and review the current documents using the portable dataport at the point where the issue arose. He or she is also able to make annotations, comment, changes or edits on the documents or layers attached to the documents while still in the field, saving the construction company a great deal of money in overhead and management time in that the conflict is resolved much quicker.

Example B

The field superintendent is reviewing the project during the twice daily walk-through when he or she notices that the blocking and electrical work in a wall, that is to be covered up the following day, is missing. Using current systems, the field superintendent tracks down, via radio, portable telephone or other means, the appropriate foremen of each of the trades affected to resolve the problem. The field superintendent also records the issue in a note book to be reminded later if contact with the relevant foreman was not made.

Solution. The portable dataport's software is designed to quickly solve the issue in example B by using the Snapshot method. This feature allows the user to take a real-time Snapshot of a portion of any document on the portable dataport, and add a note, edit, change or annotation related to that issue that can then be immediately sent via the FRFI method to the two or more relevant contractors. By using the present invention, the field superintendent can now notify both relevant contractors immediately upon recognition of the problem and quickly resolve the issue or even prevent the issue from escalating or arising all together.

As these examples demonstrate, the portable dataport of the present invention not only makes information immediately available to those who need to know, but also keeps records of each of these information transactions, optionally using its servers for recordation, tracking and backup. The construction industry in general is a very litigious industry, and as such, accurate record keeping and notifications become very important to both owners and contractors involved in litigation. The records produced from the present invention enable some of the alternative dispute resolution processes to be more effective in preventing escalation to litigation.

In this context, important feature of the present invention is the ability, through use of the View Manager, to quickly navigate through a set of documents, records, drawings notes, meeting minutes, sketches, plans, specifications or any other documents needed for a particular industry while in the field and/or while on the job site. The relationship buttons, conveniently located on the portable dataport and/or its viewable screen, keypad or anywhere else on the dataport, permits the quick navigation between related documents. The relationship buttons further include the feature of toggling back and forth from a currently viewed document to a previously viewed document. This feature of the present invention is particularly valuable in that the user is not waiting for downloads or files that are too complex to be viewed and navigated in a timely manner. By pushing the "up", "down", "left", "right", "forward", and/or "back" buttons, the user can easily navigate between related documents while preferably maintaining the exact same or similar location on the electronic document and at the exact or similar magnification or level of detail as the currently loaded electronic document. Ultimately, this feature helps the user easily navigate quickly by focusing on the information required and not the retrieval, zooming and scrolling of documents.

This relationship forming is done for both design documents and shop documents produced by trade contractors. The View Manager further permits the user to quickly navigate through the documents to solve a particular field or project issue.

Figure 18:
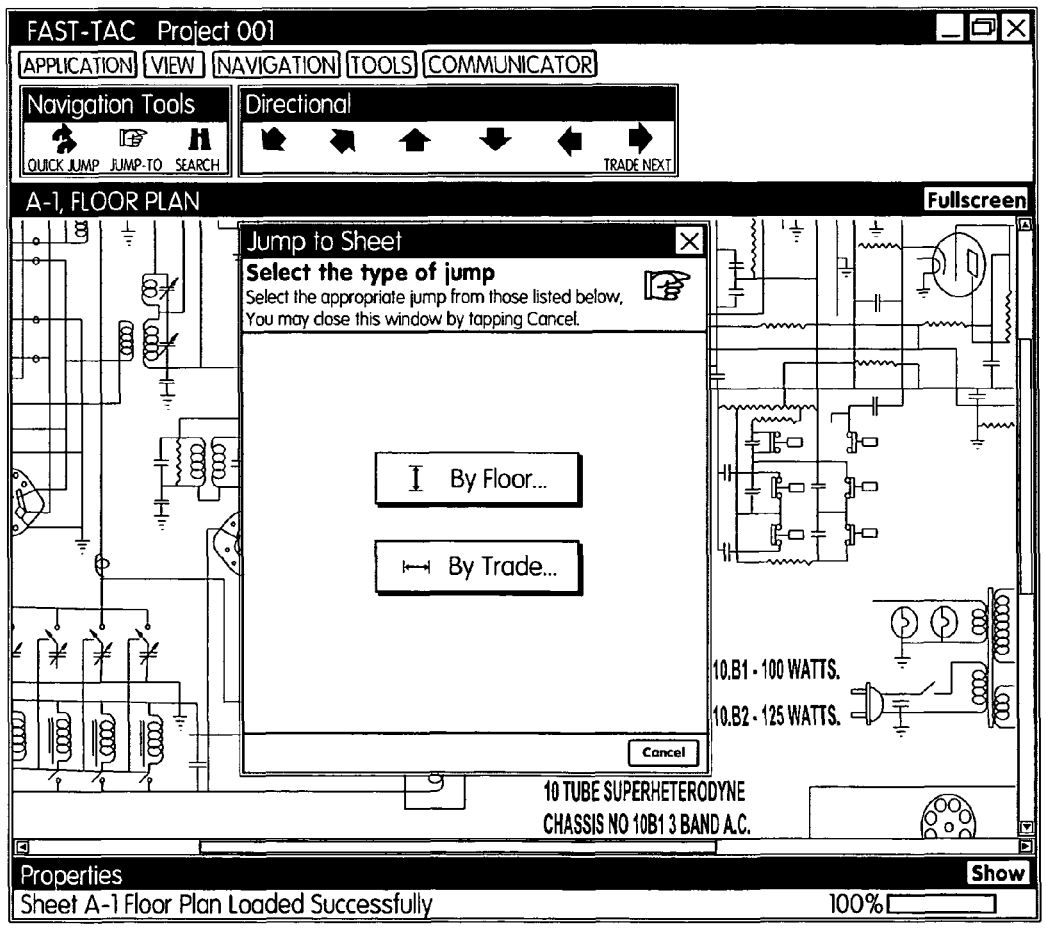
FIG. 18 is an example of a screenshot of the View Manager of the present invention showing the jump to feature.
Figure 19:
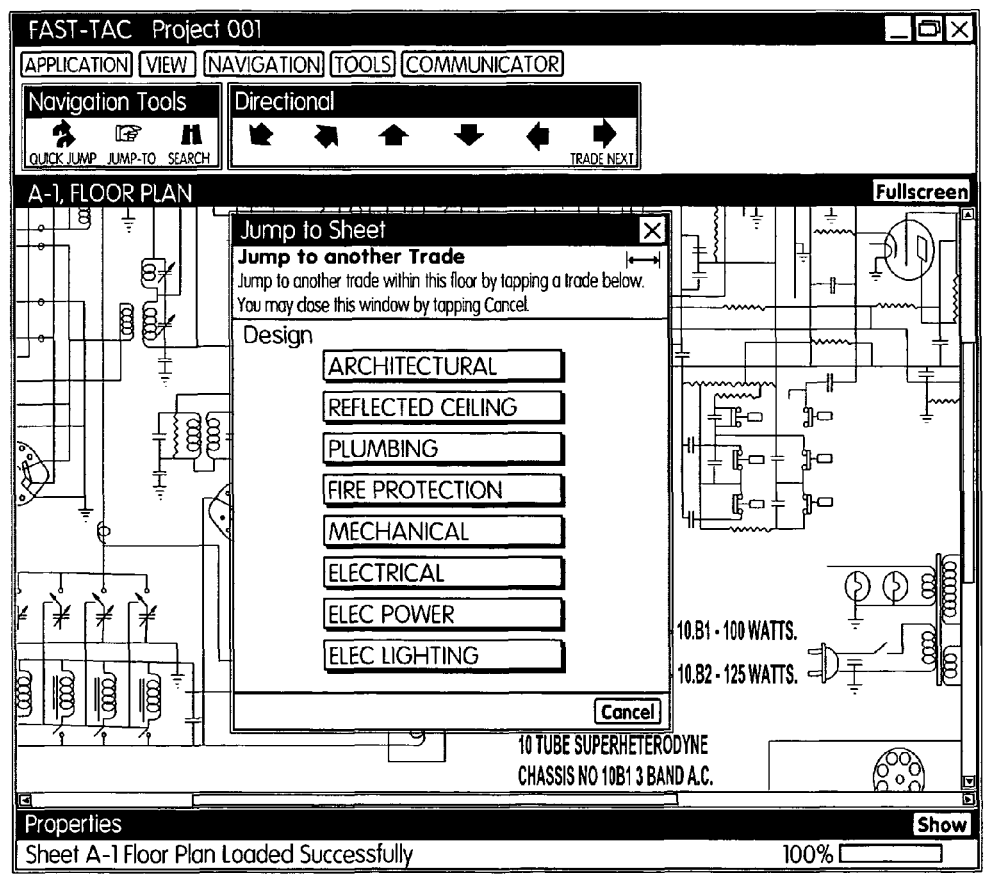
FIG. 19 is an example of a screenshot of the View Manager of the present invention displaying a more detailed view of the jump to by trade feature.

For example, and not by limitation, if a field supervisor wanted to retrieve a base document on a particular floor and by a particular trade, the user presses the jump to button and makes a selection either by floor or by trade (see FIG. 18). However, if a detail residing within that document needs to be reviewed, then the user presses the quick jump button, selects the drop down menu or writes and/or types in the desired document using the portable dataport's hand writing recognition area on or around the bottom of the viewable screen.

The View Manager can also inter-relate documents outside of the construction context in other industries without references to floors or trades.

More specifically, there are two buttons that assist the user in the operation of the present invention. The first is a relationship button that permits the user to select documents describing a different floor or level of the project installed in the portable dataport. By pushing the jump to button, the user can select to jump "by floor" (see FIG. 18), to load another document into the View Manager at the exact same or similar location and at the exact same or similar magnification, zoom or level of detail as the currently loaded electronic document. This permits the user to navigate to and view the areas above, below, around, or related to the currently viewed document.

The present invention further provides a relationship button that permits the user to select "by trade" (see FIG. 18), to load a different trade on the same floor or level currently in the View Manager. For example, a user can easily switch from electrical to plumbing. By pushing the jump to button, the user can select another trade that is loaded into the View Manager at the same or similar location and at the same magnification, zoom or level of detail as the currently loaded document. This permits the user to view other trade installations in the area of the current view. This relationship button accomplishes the same jump to feature to documents developed by the trades for the designed installations.

The jump to "by trade" and "by floor" buttons can be replaced with any other jump to button for any other industry or field, while still functioning in the same manner and while still be within the scope of the present invention. In other industries or fields, the jump to feature can be loaded into the viewer at the same or similar location, magnification, zoom or level of detail or, optionally, at a different location, magnification, zoom or level of detail, depending on the particular needs of an industry or field.

The Jump-To feature (see FIGS. 18 and 19) allows a user to navigate to another document via a two step process that narrows down the possible Jump-To points. In one preferred embodiment, the user is presented with a choice to jump in either the horizontal direction (optionally by trade) or vertical direction (optionally by floor). Once a selection is made, the user is presented with all of the documents that are connected to the current document in a given direction. More specifically, if the user chooses to jump by trade, the current floor remains constant and the user is presented with a choice of all documents within the grid of the View Manager that have the same floor value. In other industries or fields a user can jump in any direction by any other relevant criteria.

Figure 20:
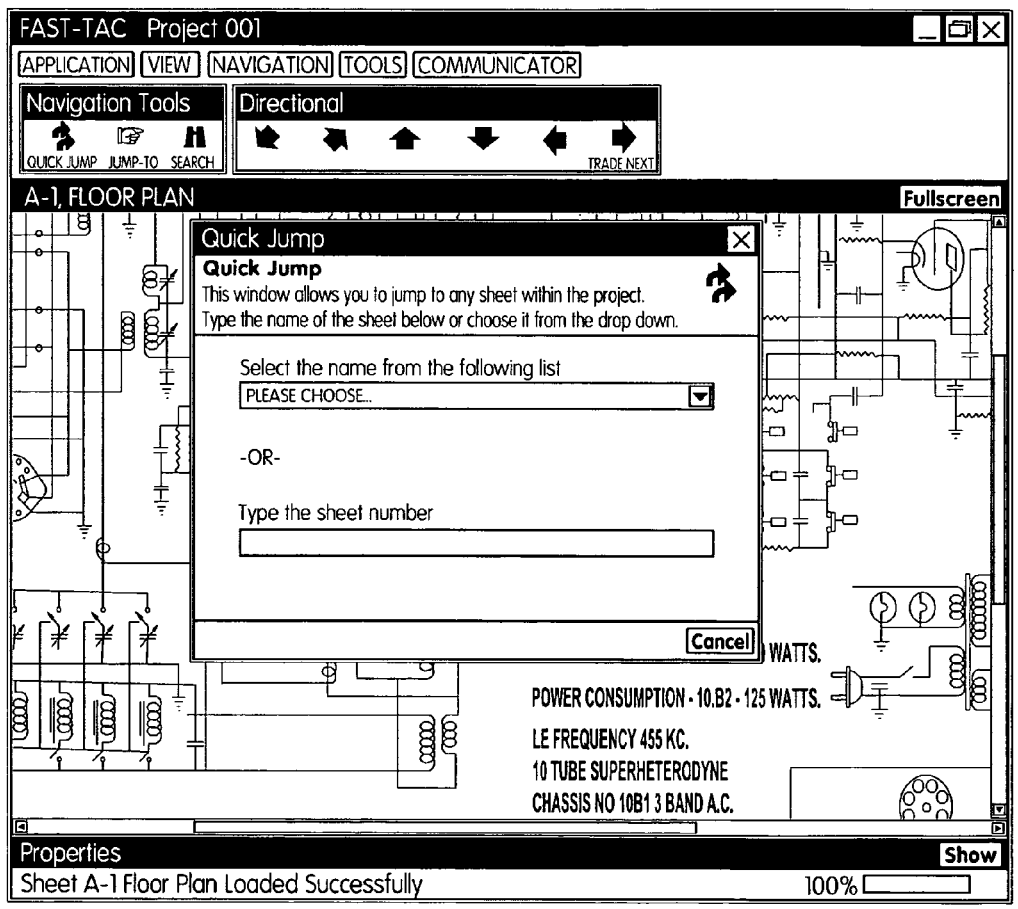
FIG. 20 is an example of a screenshot of the View Manager of the present invention teaching the quick jump feature.
Figure 21:
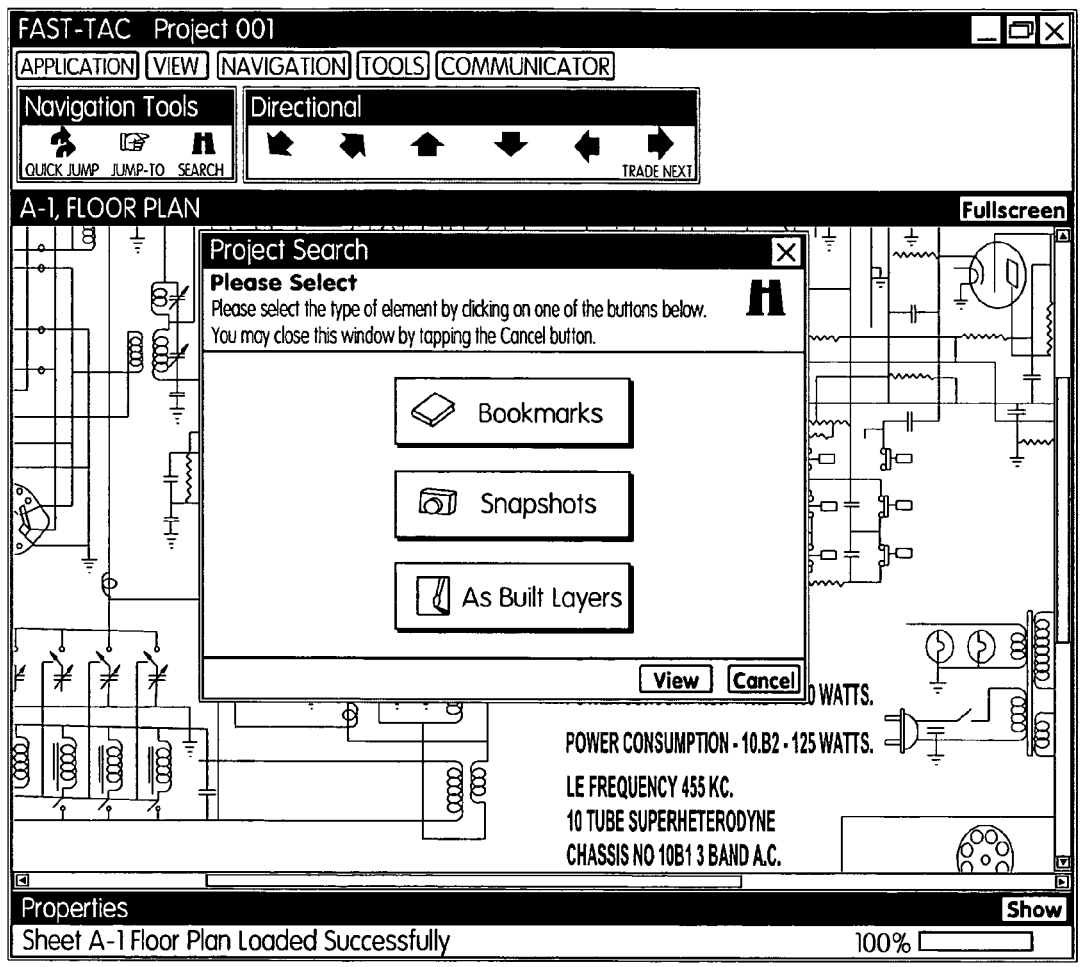
FIG. 21 is an example of a screenshot of the View Manager of the present invention showing the project searching dialogue feature.
Figure 22:
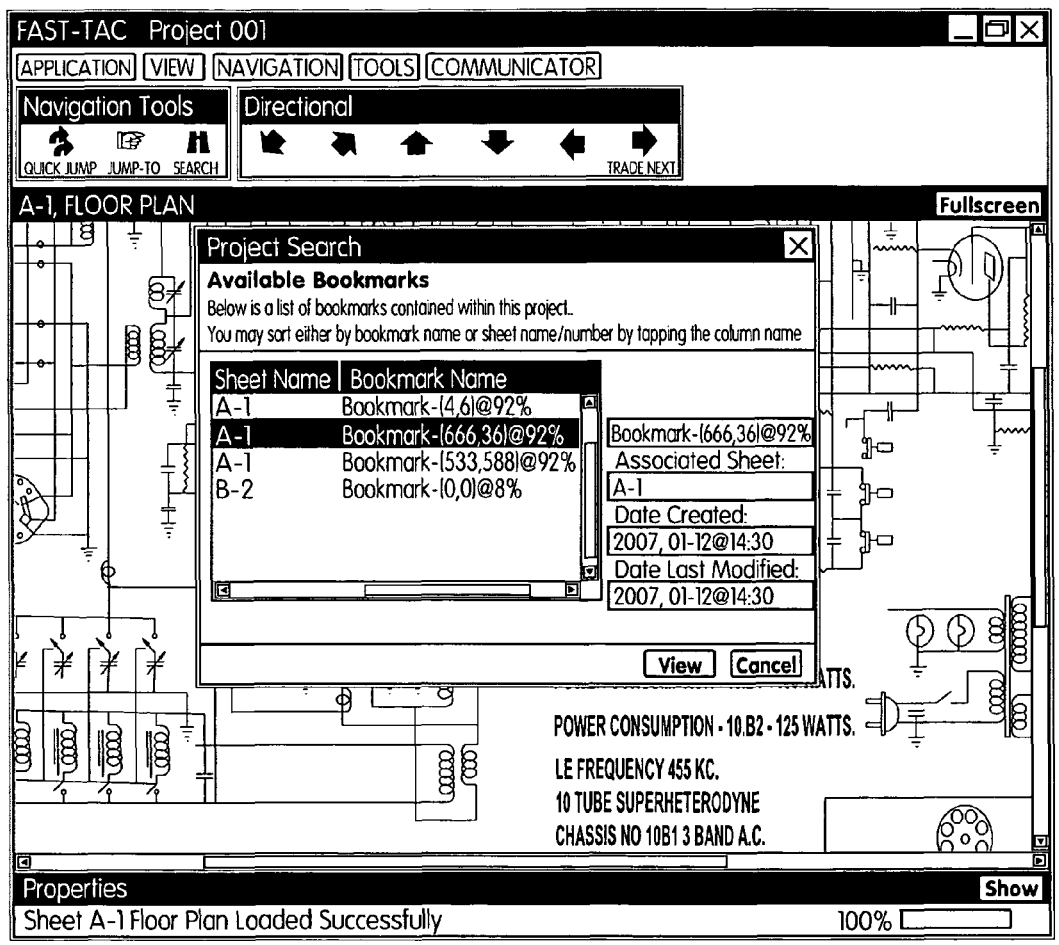
FIG. 22 is an example of a screenshot of the View Manager of the present invention displaying the project searching feature showing available bookmarks.
Figure 23:
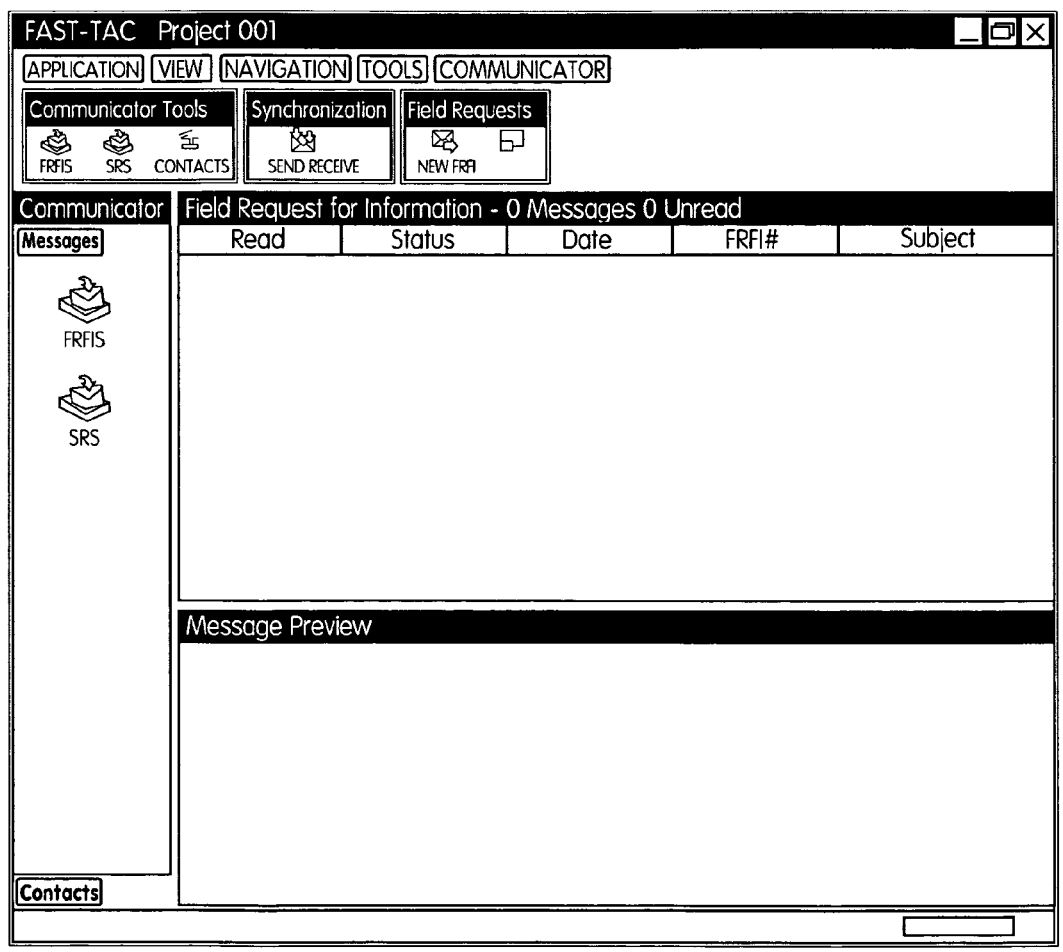
FIG. 23 is an example of a screenshot of the communication tool of the present invention. This communication tool provides a user friendly system for even novice computer, electronic transmission or email users.
Figure 24:
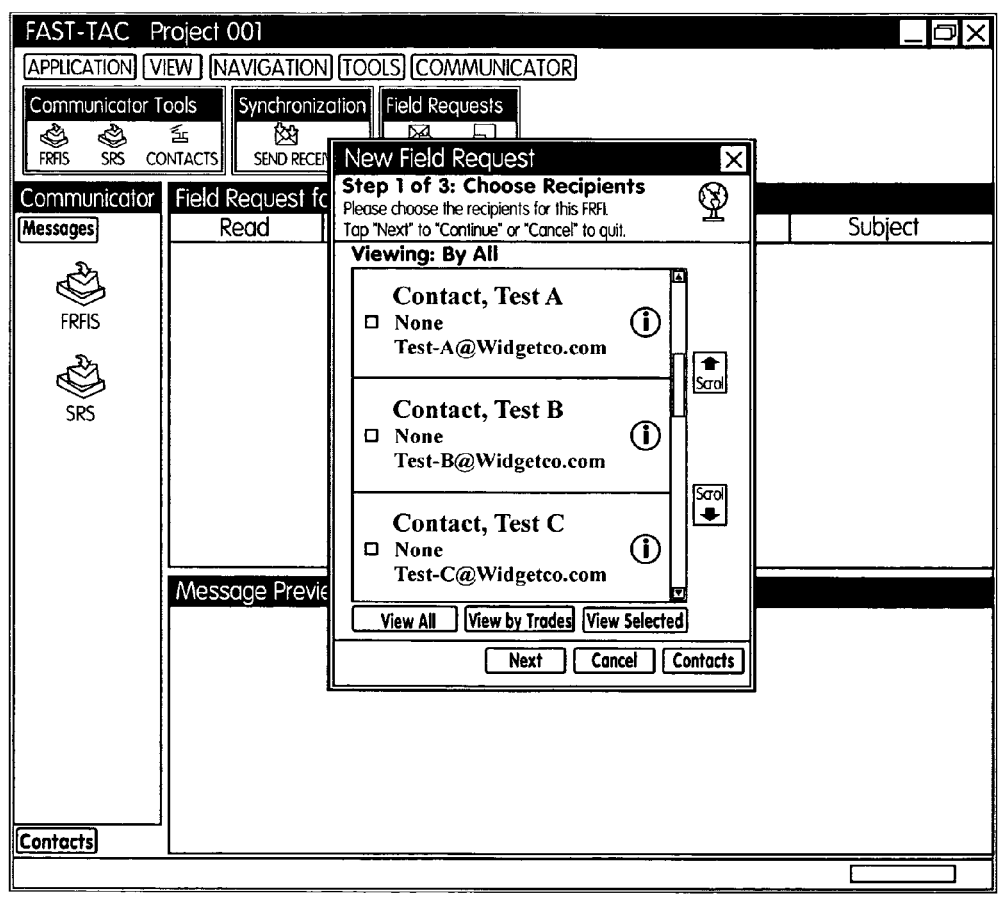
FIG. 24 is an example of a more detailed screenshot of the communication tool of the present invention showing how a user can choose recipients.
Figure 25:
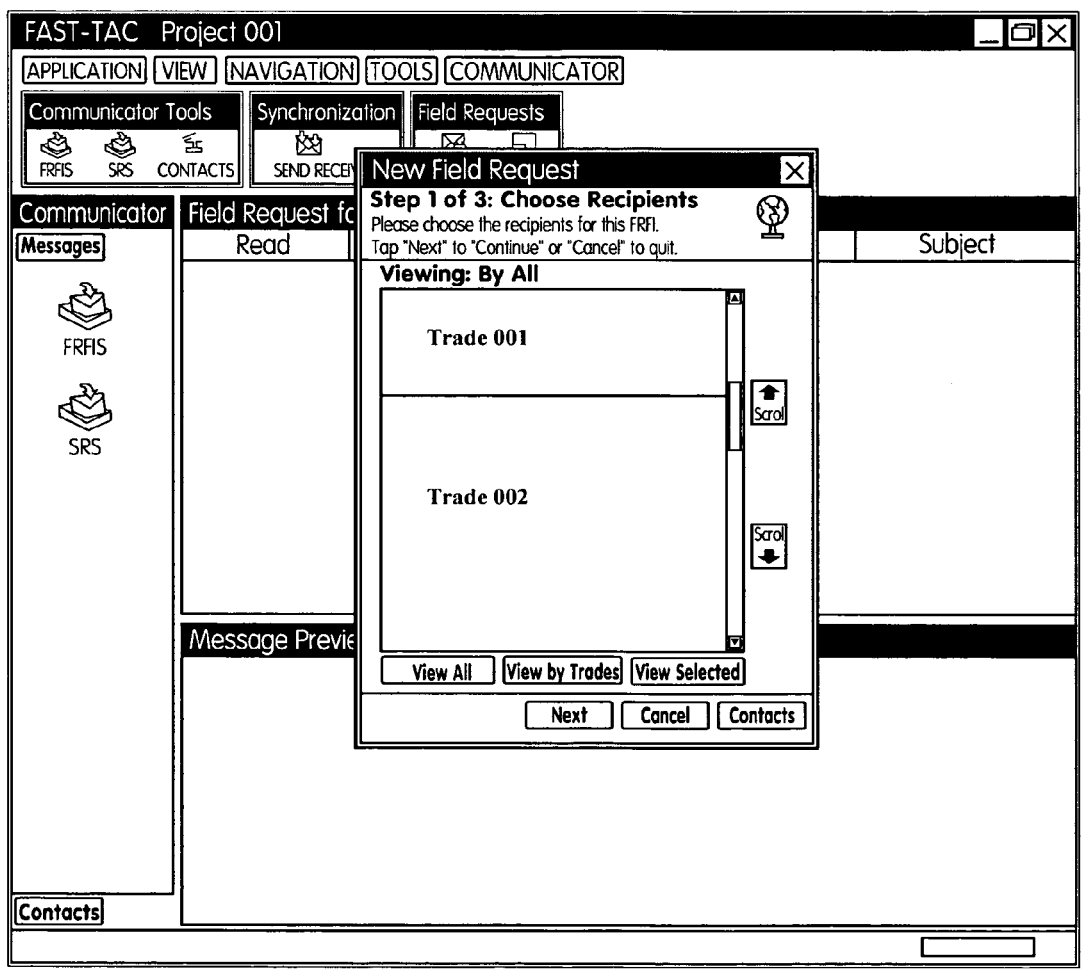
FIG. 25 is another more detailed example of a screenshot of the communication tool of the present invention showing a new field request by trade.
Figure 26:
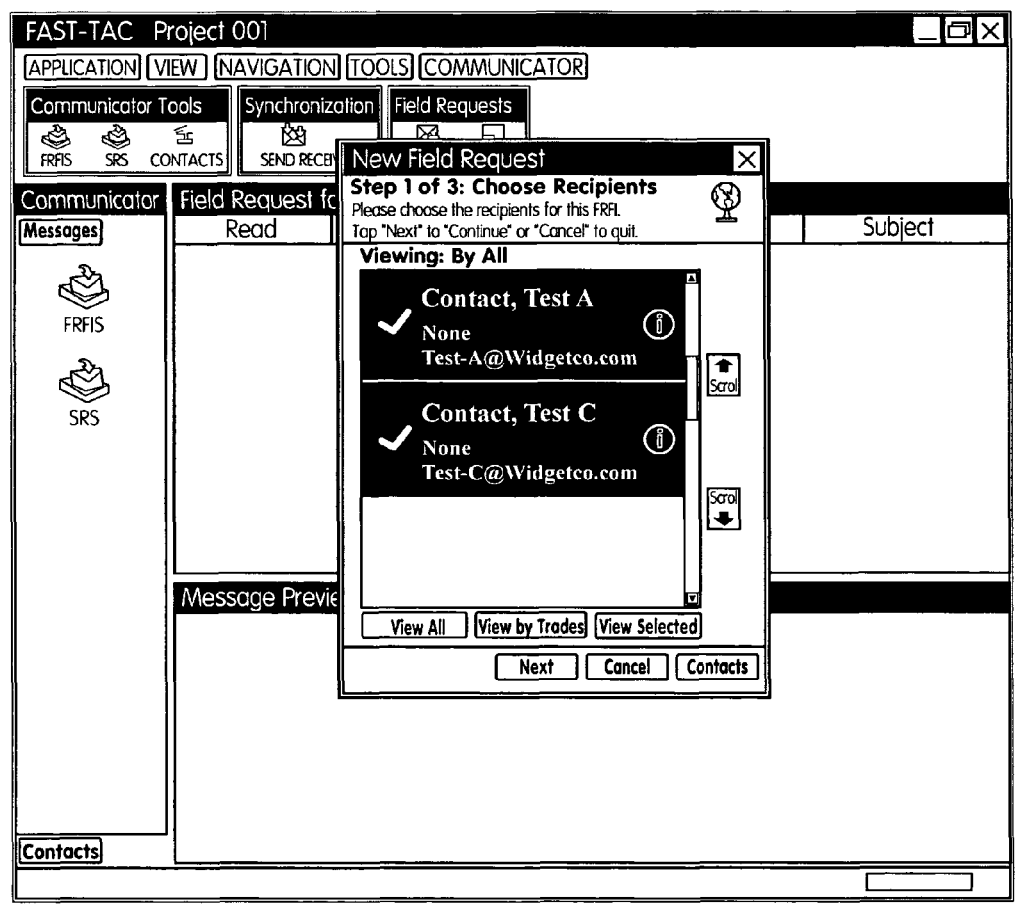
FIG. 26 is yet another more detailed example of a screenshot of the communication tool of the present invention showing the selected recipients.
Figure 27:
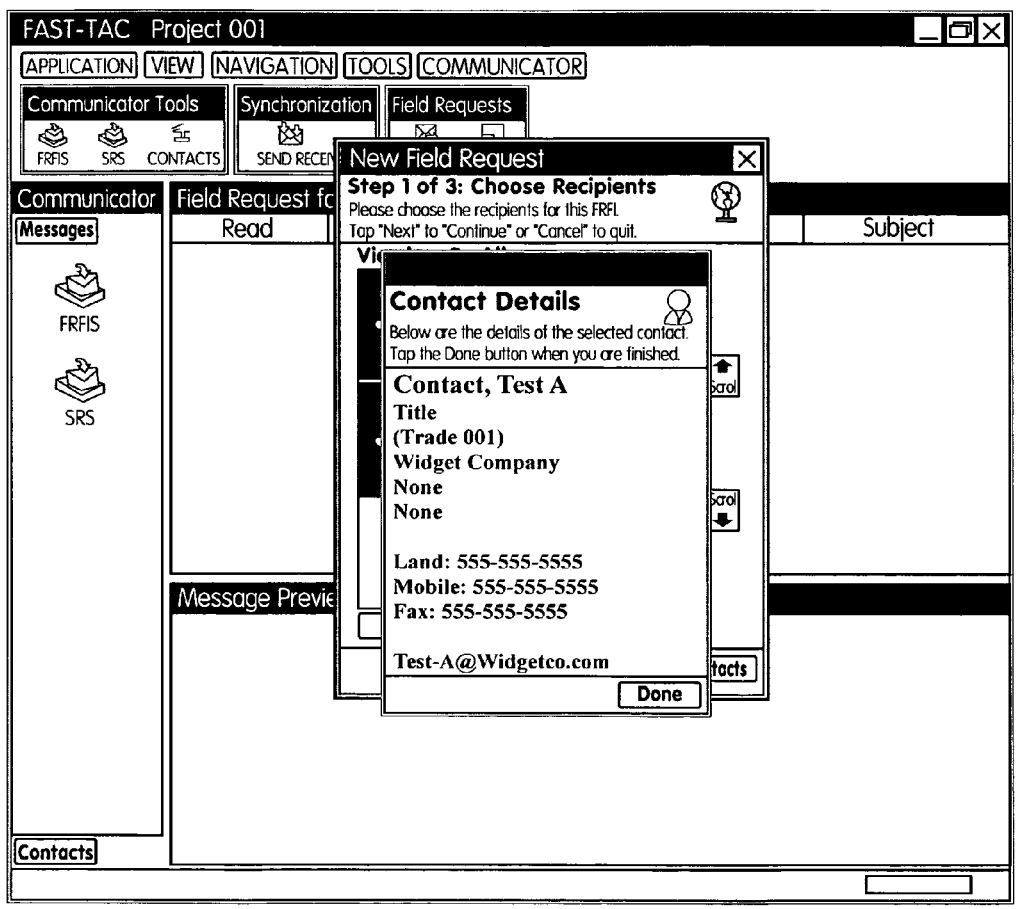
FIG. 27 is yet another more detailed example of a screenshot of the communication tool of the present invention displaying details for a particular contact.
Figure 28:
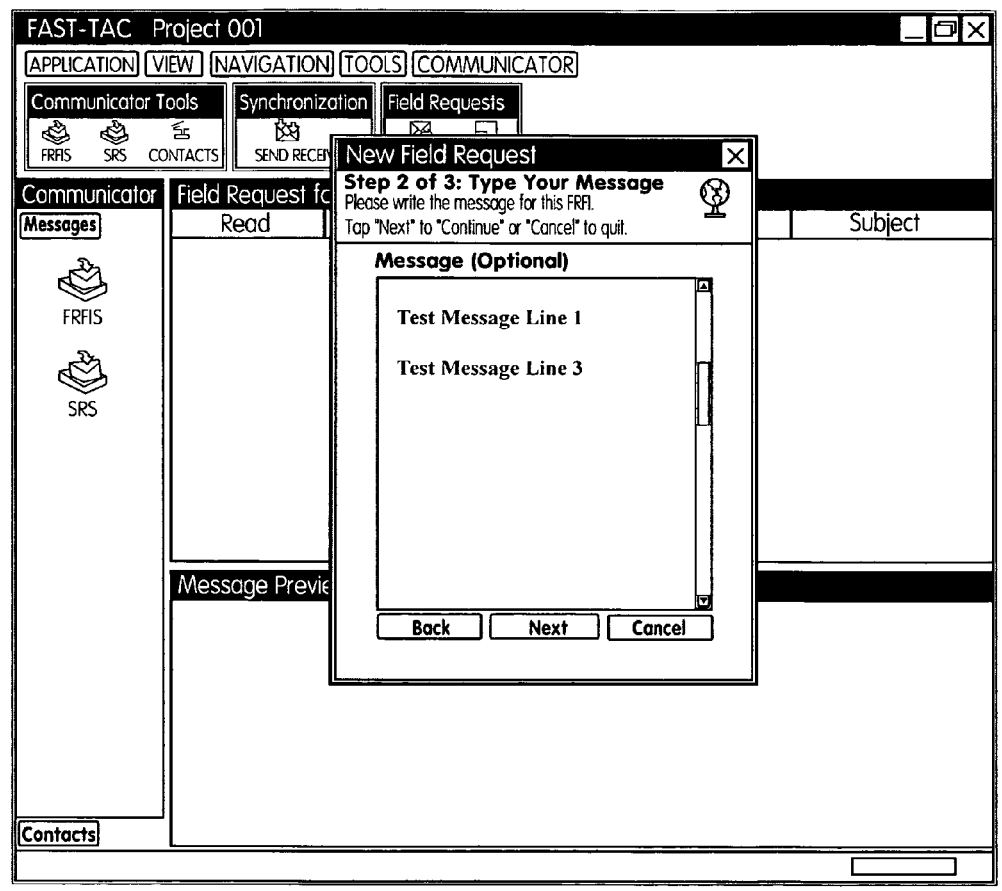
FIG. 28 is yet another more detailed example of a screenshot of the communication tool of the present invention displaying how a user would input a particular message for a contact.
Figure 29:
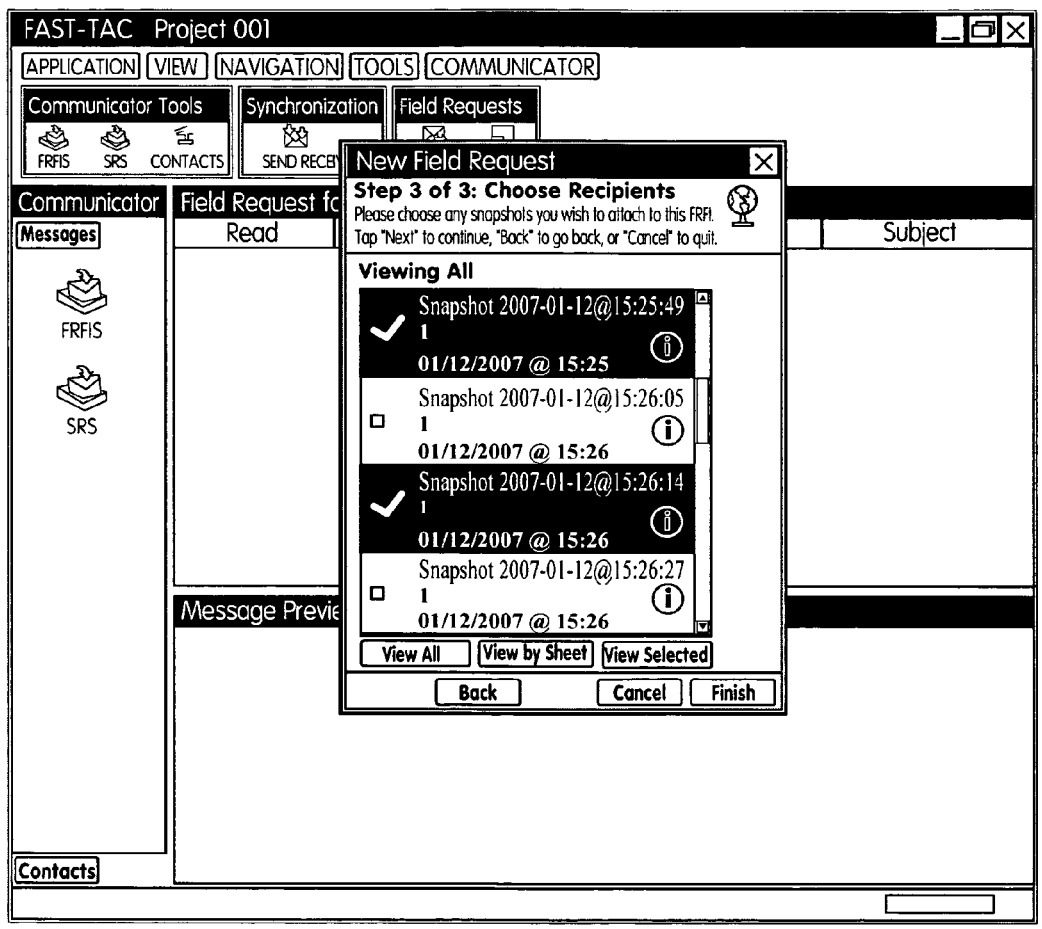
FIG. 29 is yet another more detailed example of a screenshot of the communication tool of the present invention displaying how a user can send a particular snapshot to a contact.
Figure 30:
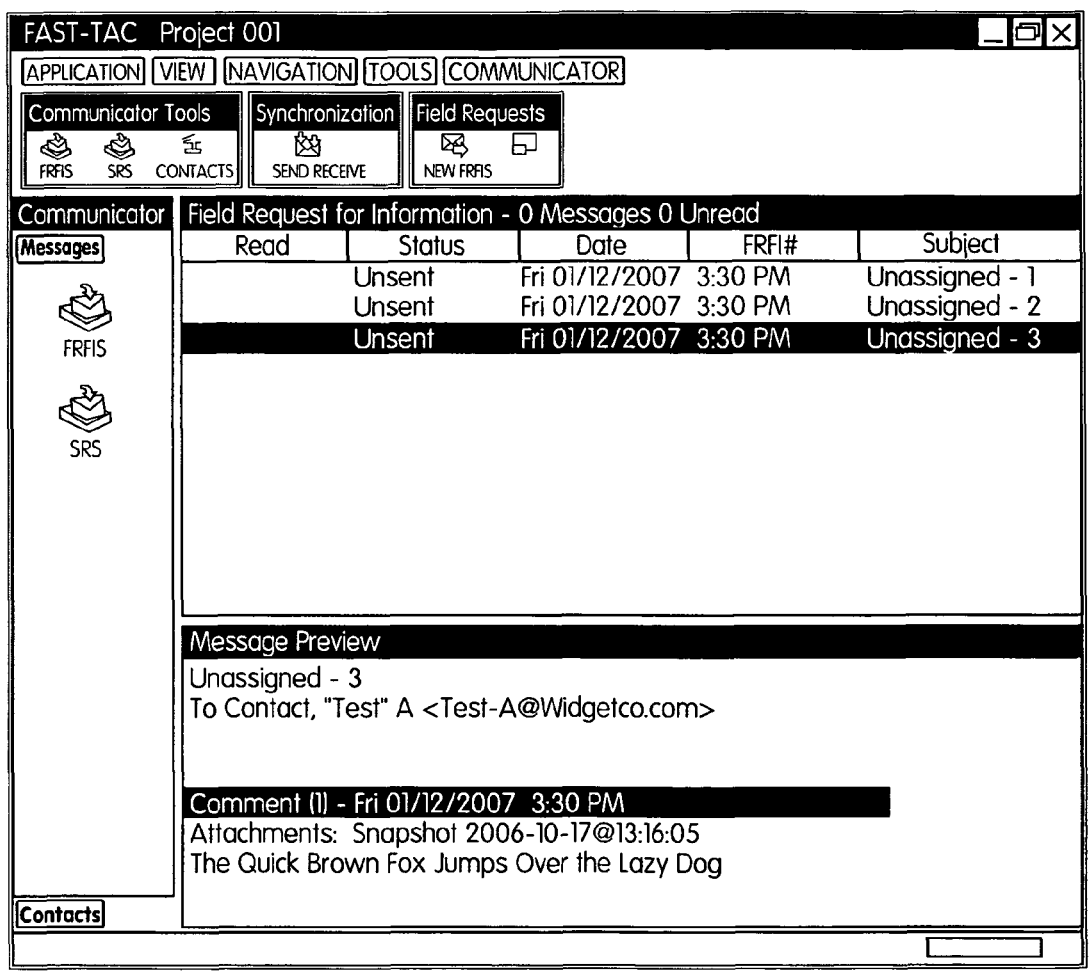
FIG. 30 is yet another more detailed example of a screenshot of the communication tool of the present invention displaying sent and unsent messages.
Figure 31:
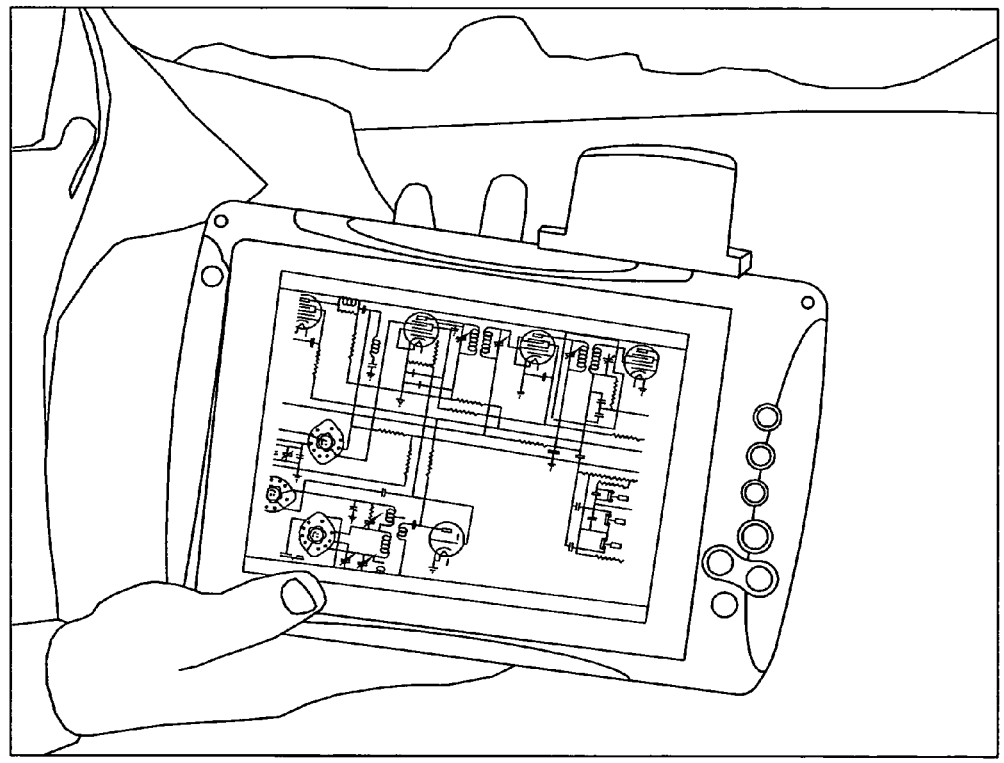
FIG. 31 is a photograph of one example of the portable dataport of the present invention.

Another feature that assists the user in the operation of the present invention is the quick jump button (see FIG. 20). The quick jump button is used in loading the viewer with a document that does not have an entire layout as its background. For instance, there are many documents that have details on them that relate to a plurality of other documents. In this case, the quick jump feature is optionally used to find a detail that is noted on the document that is currently displaced in the View Manager. The user is then able to toggle back and forth between the currently viewed document and the detailed document that has additional information regarding the issue being-investigated.

Further, the quick-jump feature (see FIG. 20) also allows the user to make a single jump anywhere within the grid of the View Manager. The user is presented with a drop down box containing all documents with the grid. This drop down box list is optionally in alphabetical order or otherwise in an easily navigable fashion. Once a selection has been made, the "loading a document not currently cached" (see FIG. 4), described below, is employed to load the document.

To permit the quick viewing of each document, the present invention provides an extensive magnification of detail capability. The "zoom in", "zoom out", "zoom box", and "zoom fit" features (see FIG. 14) assist the user in quickly navigating each document to locate the area where a problem needs to be resolved. It is also preferable for the document to be of the correct file type and size or at least be able to be modified to the correct file type and size so that the zoom features can function as described.

To improve the viewable portion of the present invention a "full screen toggle" button (see FIG. 14) is provided to enlarge the viewed area for users. This feature proves to be quite useful when explaining to others on the site, the solution to a particular issue.

Optionally, a Home button, or the like, quickly returns the user to the main hierarchy of the View Manager for easy selection of another document.

The present invention further incorporates a Search capability (see FIGS. 21-22) of all the Snapshots, As-Builts and/or Permanent Record Annotation Layers, Bookmarks, and Action Items recorded during the project for use with the field communication tool (see FIGS. 23-30) or FRFI method and for use with future needs of the field superintendent to review past document investigations.

The Permanent Record Annotation Layer, Snapshot and Bookmarks features, using the View Manager, are represented by an invisible and/or transparent overlay of a document such that annotations can be made to the document. These features can optionally be used to communicate project data and information requests to third parties.

Throughout the project, information is typically gathered to develop an as-built layer or Permanent Record Annotation Layer (see FIG. 17) at the conclusion of the project. These Permanent Record Annotation Layers or as-builts become permanently attached to the full original document. Using the as-built or Permanent Record Annotation Layer buttons, or other similar button, of the present invention, the information is gathered electronically and attached as a layer to the specific point on the document or to the document generally for production to the designers or owners at the conclusion of the project. The present invention eliminates the need to have a separate set of documents at the site or elsewhere to keep updated for the as-builts or Permanent Record Annotation Layers. This feature permits the information to be applied to future generations of documents since it is applied to a layer preferably above, but optionally below, but still attached, to the document.

The user is also able to "remember" the documents and views visited and the magnification or level of detail that was in the viewer at the time of the request, by requesting a Snapshot (See FIG. 16) of the view. A Snapshot is a "to do" reminder which is associated, but not permanently linked with a specific portion of a document. It differs from a Permanent Record Annotation Layer because it is specifically and non-permanently attached to a portion of the document, not to the document in general. The Snapshot can be optionally communicated to others on the project, so that they can provide solutions to staff, using the field communication tool (see FIG. 30). The field communication tool utilizes email, fax or other electronic communication or transmission.

A Bookmark button (see FIGS. 15 and 21) is used to create a note that is attached to a specific portion of a document. This can include text or hand-drawn sketches that help identify what is needed or what was done by the field superintendent. It is recorded the same way as the Snapshot feature and can be communicated using the field communication tool (see FIGS. 23-30) or the FRFI method of the present invention. The optional field communication tool of the present invention is very user friendly and requires only novice knowledge of computers and/or electronic transmission means. This user friendliness is a key aspect of the field communication tool of the present invention.

Another key aspect of the present invention is that the field or project staff is provided with these features and related communication solutions, while they are in the field or on site, eliminating multiple trips to a site or field trailer. In the event that the missing necessary information is not within the electronic documents on the electronic document storage device associated with the portable dataport, the present invention, in an alternative embodiment, quickly collects the reviewed Permanent Record Annotation Layers, Bookmarks, Snapshots or the like and creates a Field Request for Information (FRFI), optionally, to be immediately submitted to the design professional, document designer or other recipient via the field or project site communication tool which utilizes electronic transmission, email, fax or other electronic communication (see FIGS. 23-30). Each FRFI is numbered for tracking purposes and an optional report is provided as to the status of each FRFI on a daily, weekly, monthly basis or at any other time increment. The design professional or other recipient opens the electronic transmission, using email or other standard viewing software. Depending on the availability of the design professional or other recipient, the turn around time is significantly shortened when compared to related art systems. An important feature of the present invention is its ability to quickly forward the FRFI, preferably from the field or project site, to the appropriate designer or other intended recipient so that it is not forgotten and so that it does not fall through the cracks as it may have in the past.

In addition, at the end of every project is the task of developing a punch list or action items list of the work that needs to be corrected for the project to be completed. The invention can incorporate an action items list or punch list option which preferably is activated late in a project to enable field staff to generate and distribute the list. This feature also aids in the recordation of the punch list or action items list on a daily basis and helps to issue the list to each of the involved parties. This action items list is developed, annotated and sent to the responsible or intended parties through the field communication tool.

By way of general summary, the portable dataport of the present invention and/or its software and/or methodology has the following attributes, a portion of which are available as "add-ons" in alternative embodiments: the association of electronic documents; the retrieval of electronic documents, from the electronic document storage device associated with the portable dataport, for viewing; the recordation and annotation of electronic documents viewed; the sketching of solutions for review; the bundling of electronic documents viewed; the electronic transmission of the electronic documents to the relevant or intended persons; the creation or organization of an action items list or punch list; the creation of as-built or Permanent Record Annotation Layers; the searching of recorded views; the utilization of a field or project field communication tool to submit a FRFI; the creation and tracking of FRFI logs; the creation of electronic document records on the host server or electronic document storage device associated with the portable dataport; the optional ability to be updated wirelessly by a server; and, creating an inter-relationship between related electronic documents.

Also within the scope of the present invention are the following optional attributes of the portable dataport: the generation of daily reports and action items lists; the generation of daily time sheets for labor; the ordering of materials, while in the field or on the project site; the Radio Frequency Identification Tag Locator for determining a user's location in a building or structure; the voice recognition feature; the photograph taking feature; the Leadership Energy Environmental Design (LEED) work sheets and/or blank forms provided on the dataport for easy tracking; the collaboration with other software; and, the synchronization with an optional remote host server to provide the ability to download or upload real-time documents onto the portable dataport, wherein the synchronization is used to access and store up-to-date secondary project elements such as but not limited to uses, contacts, security access, software, developmental tool or any other project element that could be used for a particular industry, area or field. These features can be modified for use in any industry, area or field.

Currently, the hardware and/or portable dataport being used for the delivery of the software and documents is the Itronix Duo-Touch, which is set up with specified memory, Windows Software, communication and Tablet Software, however, any similar hardware and/or portable dataport or other computer is within the scope of the present invention.

The present invention optionally further comprises an optional server, preferably housed in a server farm as outsourced support. Optionally, the server is housed on site for a project, or can be housed internally with the present invention's provider. The portable dataport is manufactured by an outsourced supplier building the portable dataport to certain specifications. The Internet service provider is preferably accomplished through one of the existing cell phone service providers, but can also use other services. The invention preferably operates by developing strategic partnerships with each of these above-mentioned entities to provide superior service to clients and/or owners.

It is important to note that the portable dataport and/or View Manager of the present invention is not dependant on any server to function properly. All the documents and document data can optionally be placed directly on the electronic storage device associated with the portable dataport, eliminating the need for an external server.

The present invention anticipates a holistic approach to field/paper document management. The holistic approach means that the client and/or owner sends their documents (hard copy or electronic) to the present invention's operation where a technician or other individual places the documents into a document matrix; aligns their corners; optionally stores them on a server (the documents can also be loaded directly onto an electronic document storage device associated with the portable dataport and the server can be eliminated in some uses); loads them onto a portable dataport platform; sends the portable dataport platform to a field superintendent; trains the field superintendent; optionally remains connected through wireless communications (where available and where a server is used); updates the documents as requested by a client and/or owner, loads shop documents as requested by a client and/or owner; keeps all Snapshots, Bookmarks, and as-built or Permanent Record Annotation Layers backed up on the optional server or on the electronic document storage device; and, at the conclusion of a project, downloads the documents (from the optional server or the electronic document storage device) with all Snapshots, Bookmarks, and as-built layers or Permanent Record Annotation Layers attached and installs them onto a DVD, CD, disk or other hard drive and sends them the client and/or owner for record keeping purposes.

Other uses for this technology in the field or at a project site are speedy solutions to requests for information and FRFIs, green building record keeping, daily construction reports, daily time sheets, material requisitions, photographic record keeping and any other related uses.

Although this invention was created with the construction industry in mind, it should also be considered applicable to many other industries wherein an organized electronic relationship of a plurality of documents is critical to the successful accomplishment of a task. The present invention, for example, could be used in at least the medical, information science, real estate management, design and engineering, transportation industry, plan and building operations, building management, emergency services, operations management and many other industries and/or fields where electronic documents must be retrieved, inter-related, annotated, managed and/or edited at a point of need.

We claim:

1. A portable dataport for document retrieving, inter-relating, annotating and management comprising:
    an electronic document storage device associated with the dataport, for storing a plurality of related electronic documents associated with a project, wherein the plurality of related electronic documents are at least a one dimensional grid; and
    a view manager having a plurality of scrollable image viewers in communication with the electronic document storage device,
    wherein a related electronic document of the plurality of related electronic documents is loaded into one scrollable image viewer of the plurality of scrollable image viewers for immediate viewing as a currently viewed document,
    wherein a scale of the currently viewed document is saved in the view manager,
    wherein an (x, y) coordinate of a corner of a viewable area of the currently viewed document is saved in the view manager,
    wherein the scale of the currently viewed document and the (x, y) coordinate of the corner of the viewable area of the currently viewed document are applied to a subsequently viewed document when the subsequently viewed document is painted in another scrollable image viewer of the plurality of scrollable image viewers such that a viewable area of the subsequently viewed document is the same as the viewable area of the currently viewed document,
    wherein the subsequently viewed document is another related electronic document of the plurality of related electronic documents associated with the project, and
    wherein the dataport, using the view manager, takes a snapshot of a particular portion of the currently viewed document, wherein the snapshot identifies a location and a magnification of detail of a portion of the currently viewed document, creates a copy of the document portion, and permits a user to directly annotate on the document portion copy.

2. The portable dataport of claim 1, wherein the electronic document storage device is integral with the portable dataport.

3. The portable dataport of claim 1, wherein the electronic document storage device is external to the portable dataport.

4. The portable dataport of claim 1, wherein at least a two-dimensional grid is used.

5. The portable dataport of claim 1, wherein the portable dataport is selected from the group consisting of a tablet personal computer, a notebook personal computer and a desktop personal computer.

6. The portable dataport of claim 1, wherein the portable dataport retrieves the documents through a design grid view or a design tables view.

7. The portable dataport of claim 1, wherein the portable dataport allows the user to toggle back and forth from the currently viewed document to a previously viewed document, wherein the scale of the currently viewed document and the (x, y) coordinate of the corner of the viewable area of the currently viewed document are applied to the previously viewed document when the previously viewed document is painted in another scrollable image viewer of the plurality of scrollable image viewers such that a viewable area of the previously viewed document is the same as the viewable area of the currently viewed document.

8. The portable dataport of claim 1, wherein the portable dataport, using the view manager, bookmarks a portion of the currently viewed document, wherein the bookmark is represented and recorded as a note or transparent overlay of the currently viewed document such that annotations can be made about the document on the note or overlay.

9. The portable dataport of claim 1, wherein the portable dataport, using the view manager, creates and organizes a permanent record annotation layer on the currently viewed document, wherein the permanent record annotation layer is represented and recorded as a transparent overlay of the currently viewed document such that annotations can be made to the currently viewed document.

10. The portable dataport of claim 1, wherein the portable dataport creates and organizes an action items list related to the currently viewed document.

11. The portable dataport of claim 1, wherein the portable dataport inter-relates and electronically links one or more of the permanent record annotation layers, action item lists, snapshots and bookmarks to create a field request for information.

12. The portable dataport of claim 1, further comprising a field communication tool to track and communicate a field request for information to intended recipients.

13. The portable dataport of claim 1, wherein the portable dataport wirelessly synchronizes to a remote, host server to provide the ability to load real-time documents onto the portable dataport.

14. The portable dataport of claim 13, wherein the wireless synchronization is used to access and store up-to-date secondary project elements, and wherein the secondary project elements are selected from the group consisting of users, contacts, security access, software and developmental tools.

15. The portable dataport of claim 1, further comprising a materials ordering function for use when the user is on a job site.

16. The portable dataport of claim 1, further comprising a voice recognition means.

17. The portable dataport of claim 1, further comprising a photograph taking means.

18. The dataport of claim 1, wherein the view manager in connection with document loading and retrieval:
retrieves the plurality of related electronic documents associated with the project from the electronic document storage device;
creates a data structure that contains coordinate data and navigations keys for each related electronic document of the plurality of related electronic documents;
creates a scrollable image viewer for the each related electronic document of the plurality of related electronic documents based upon the coordinate data;
creates a first hash map for containing the scrollable image viewers; and
creates a second hash map for containing cardinality keys corresponding to the coordinate data.

19. The dataport of claim 1, wherein the view manager, in connection with the related electronic document of the plurality of related electronic documents for viewing:
identifies the related electronic document for viewing;
loads the coordinate data and navigation key for the related electronic document from the data structure;
uses the navigation key of the related electronic document to identify associated related electronic documents of the plurality of related electronic documents based upon review of the coordinate data for all project documents;
creates a background thread for each related electronic document to facilitate the loading of the associated related electronic documents from the data structure into background scrollable image viewers;
loads the related electronic document selected for viewing into a main scrollable image viewer;
populates a properties panel on the portable dataport with information about the related electronic document identified for viewing;
updates the status of navigation buttons on the portable dataport based upon the identified associated related electronic documents;
loads the associated related electronic documents into the background, in their own background scrollable image viewers, and
displays the currently viewed document.

20. The dataport of claim 1, wherein the view manager, in connection with navigation from the related electronic document to a new, related electronic document:
selects the new, related electronic document for viewing;
determines which background scrollable image viewer contains the new, related electronic document selected for viewing;
rearranges the plurality of scrollable image viewers so that the scrollable image viewer containing the new, related electronic document becomes a main scrollable image viewer;
loads the coordinate data and navigation key for the new, related electronic document selected for viewing;
uses the navigation key of the new, related electronic document selected for viewing to identify associated new related electronic documents based upon review of document coordinates for all project documents;
creates a new background thread for each associated new related electronic document to facilitate the loading of associated new related electronic documents into background scrollable image viewers;
populates the properties panel on the portable dataport with information about the new, related electronic document selected for viewing;
updates the status of navigation buttons on the portable dataport based upon the identified associated new related electronic documents;
loads the identified associated new related electronic documents into the background scrollable image viewers; and
displays the related electronic document selected for viewing.

21. The portable dataport of claim 1, wherein the view manager, in connection with navigation from the currently viewed document to the subsequently viewed document further:
- reviews the prior related electronic documents to determine if they remain related electronic documents; and
- deletes the prior related project documents in background scrollable image viewers that are not determined to be a new identified related electronic documents.

22. The portable dataport of claim 1, wherein the plurality of related electronic documents are a plurality of related electronic drawings.

23. The portable dataport of claim 1, wherein an adjacent related electronic document of the plurality of related electronic documents being one grid position away from the currently viewed document on the at least one dimensional grid is loaded in a background scrollable image viewer.

24. The portable dataport of claim 1, wherein the currently viewed document is scalable from 100% to a lower percentage for a magnified view of a location.

25. The portable dataport of claim 1, wherein the view manager further:
- scales the subsequently viewed document to the scale of the currently viewed document; and
- positions the another scrollable image viewer of the plurality of scrollable image viewers to the (x, y) coordinate of the corner of the viewable area of the currently viewed document.

\* \* \* \* \*